United States Patent
Iwasaki

(10) Patent No.: US 10,318,482 B2
(45) Date of Patent: Jun. 11, 2019

(54) INFORMATION PROCESSING SYSTEM AND METHOD FOR DISPLAYING LIST OF FILES

(71) Applicant: Ayumi Iwasaki, Tokyo (JP)

(72) Inventor: Ayumi Iwasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 15/216,759

(22) Filed: Jul. 22, 2016

(65) Prior Publication Data

US 2017/0031938 A1    Feb. 2, 2017

(30) Foreign Application Priority Data

Jul. 30, 2015    (JP) .................................. 2015-150467

(51) Int. Cl.
     *G06F 16/00*      (2019.01)
     *G06F 16/16*      (2019.01)

(52) U.S. Cl.
     CPC .......... *G06F 16/164* (2019.01); *G06F 16/168* (2019.01)

(58) Field of Classification Search
None
See application file for complete search history.

(56) References Cited

U.S. PATENT DOCUMENTS

| | | | |
|---|---|---|---|
| 5,832,511 A * | 11/1998 | Beck ......................... | G06F 8/71 |
| 7,483,874 B2 * | 1/2009 | Accapadi ............ | G06F 17/3012 |
| 2002/0078819 A1 * | 6/2002 | Kim ...................... | G10H 1/0041 84/609 |
| 2008/0126432 A1 * | 5/2008 | Ahn ..................... | G06F 17/2276 |
| 2010/0122154 A1 * | 5/2010 | Howell ................. | G06F 17/241 715/233 |
| 2011/0258523 A1 * | 10/2011 | Song ................... | G06F 15/0225 715/201 |
| 2012/0144315 A1 * | 6/2012 | Rosenberger ......... | G06F 17/301 715/748 |

FOREIGN PATENT DOCUMENTS

| | | |
|---|---|---|
| JP | H04-260140 | 9/1992 |
| JP | H07-182214 | 7/1995 |
| JP | H08-009574 | 1/1996 |
| JP | 2007-334785 | 12/2007 |

* cited by examiner

*Primary Examiner* — Son T Hoang
(74) *Attorney, Agent, or Firm* — IPUSA, PLLC

(57) ABSTRACT

An information processing system includes an information processing apparatus including a first processor configured to execute a first program to implement a first part of an information processing process, and one or more information terminals each including a second processor configured to execute a second program to implement a second part of the information processing process. The information processing process includes obtaining a list of one or more files stored in a storage and marker information correlating a marker with a corresponding process, adding additional information obtained by the process corresponding to the marker to the list in response to determining that the marker is included in a name of a file included in the list, and displaying the list to which the additional information is added on one of the one or more information terminals.

13 Claims, 24 Drawing Sheets

| MARKER | POSITION | PROCESS | DISPLAY FORM |
|---|---|---|---|
| ■ | BEGINNING OF FILENAME (FOLDER NAME) | COUNTING NUMBER OF FILES IN FOLDER | BADGE |
| ☐ | BEGINNING OF FILENAME (FOLDER NAME) | CALCULATING TOTAL SIZE OF FILES IN FOLDER | BADGE |
| ▲ | BEGINNING OF FILENAME (FOLDER NAME) | OBTAINING FILENAME OF LATEST FILE OF FILES IN FOLDER | DISPLAYING IN LIST |
| (shared) | END OF FILENAME (FOLDER NAME) | OBTAINING LAST-UPDATED-BY USER | DISPLAYING IN LIST |
| [p] | BEGINNING OF FILENAME (FOLDER NAME) | OBTAINING NUMBER OF PAGES | DISPLAYING IN LIST |
| jpg | EXTENSION | OBTAINING NUMBER OF PIXELS | DISPLAYING IN LIST |

FIG.6

| MARKER | POSITION | PROCESS | DISPLAY FORM |
|---|---|---|---|
| ■ | BEGINNING OF FILENAME (FOLDER NAME) | COUNTING NUMBER OF FILES IN FOLDER | BADGE |
| □ | BEGINNING OF FILENAME (FOLDER NAME) | CALCULATING TOTAL SIZE OF FILES IN FOLDER | BADGE |
| ▲ | BEGINNING OF FILENAME (FOLDER NAME) | OBTAINING FILENAME OF LATEST FILE OF FILES IN FOLDER | DISPLAYING IN LIST |
| (shared) | END OF FILENAME (FOLDER NAME) | OBTAINING LAST-UPDATED-BY USER | DISPLAYING IN LIST |
| [p] | BEGINNING OF FILENAME (FOLDER NAME) | OBTAINING NUMBER OF PAGES | DISPLAYING IN LIST |
| jpg | EXTENSION | OBTAINING NUMBER OF PIXELS | DISPLAYING IN LIST |

FIG.8

| FILE LIST | |
|---|---|
| ■RECEIVED FAX DOCUMENTS<br>2015/07/07 17:32:21 | |
| MEETING MINUTES<br>2015/06/21 12:11:05 | |
| ▲MANUALS<br>2015/07/05 09:44:11 | [LATEST] MANUALver3.pdf |
| □TEST DATA<br>2015/07/08 14:41:35 | |
| image1.jpg<br>2015/06/15 10:23:14<br>405KB | [SIZE] 800 × 600 |
| image2.jpg<br>2015/06/20 13:02:52<br>502KB | [SIZE] 1280 × 720 |
| WBS(shared).xlsx<br>2015/07/03 16:01:22<br>712KB | [LAST UPDATED BY] JOHN |
| [p]APPLICATION.pdf<br>2015/5/01 19:14:46<br>108KB | [NUMBER OF PAGES] 4 |

FIG.12

| | | |
|---|---|---|
| | RECEIVED FAX DOCUMENTS<br>2015/07/07 17:32:21 | |
| | MEETING MINUTES<br>2015/06/21 12:11:05 | |
| | MANUALS<br>2015/07/05 09:44:11 | [LATEST] MANUALver3.pdf |
| | TEST DATA<br>2015/07/08 14:41:35 | |
| | image1.jpg<br>2015/06/15 10:23:14<br>405KB | [SIZE] 800 × 600 |
| | image2.jpg<br>2015/06/20 13:02:52<br>502KB | [SIZE] 1280 × 720 |
| | WBS.xlsx<br>2015/07/03 16:01:22<br>712KB | [LAST UPDATED BY] JOHN |
| | APPLICATION.pdf<br>2015/5/01 19:14:46<br>108KB | [NUMBER OF PAGES] 4 |

1030 — FILE LIST

FIG.13

| MARKER | POSITION | PROCESS | DISPLAY FORM | DELETABILITY |
|---|---|---|---|---|
| ■ | BEGINNING OF FILENAME (FOLDER NAME) | COUNTING NUMBER OF FILES IN FOLDER | BADGE | YES |
| □ | BEGINNING OF FILENAME (FOLDER NAME) | CALCULATING TOTAL SIZE OF FILES IN FOLDER | BADGE | YES |
| ▲ | BEGINNING OF FILENAME (FOLDER NAME) | OBTAINING FILENAME OF LATEST FILE OF FILES IN FOLDER | DISPLAYING IN LIST | YES |
| (shared) | END OF FILENAME (FOLDER NAME) | OBTAINING LAST-UPDATED-BY USER | DISPLAYING IN LIST | YES |
| [p] | BEGINNING OF FILENAME (FOLDER NAME) | OBTAINING NUMBER OF PAGES | DISPLAYING IN LIST | YES |
| jpg | EXTENSION | OBTAINING NUMBER OF PIXELS | DISPLAYING IN LIST | NO |

FIG.16

| POSITION LIST |
| --- |
| BEGINNING OF FILENAME (FOLDER NAME) |
| END OF FILENAME (FOLDER NAME) |
| PART OF FILENAME (FOLDER NAME) |
| EXTENSION |
| ... |

FIG.17

| PROCESS LIST |
| --- |
| COUNTING NUMBER OF FILES IN FOLDER |
| CALCULATING TOTAL SIZE OF FILES IN FOLDER |
| OBTAINING FILENAME OF LATEST FILE OF FILES IN FOLDER |
| OBTAINING LAST-UPDATED-BY USER |
| OBTAINING NUMBER OF PAGES |
| OBTAINING NUMBER OF PIXELS |
| ... |

FIG.18

| DISPLAY FORM LIST |
| --- |
| BADGE |
| DISPLAYING IN LIST |
| ... |

| USER | INFORMATION TERMINAL | ADDITIONAL INFORMATION DISPLAY NECESSITY/ NON-NECESSITY |
|---|---|---|
| A | A001 | YES |
| B | A002 | NO |
| C | A003 | YES |
| D | A004 | YES |
| ... | ... | ... |

FIG.24

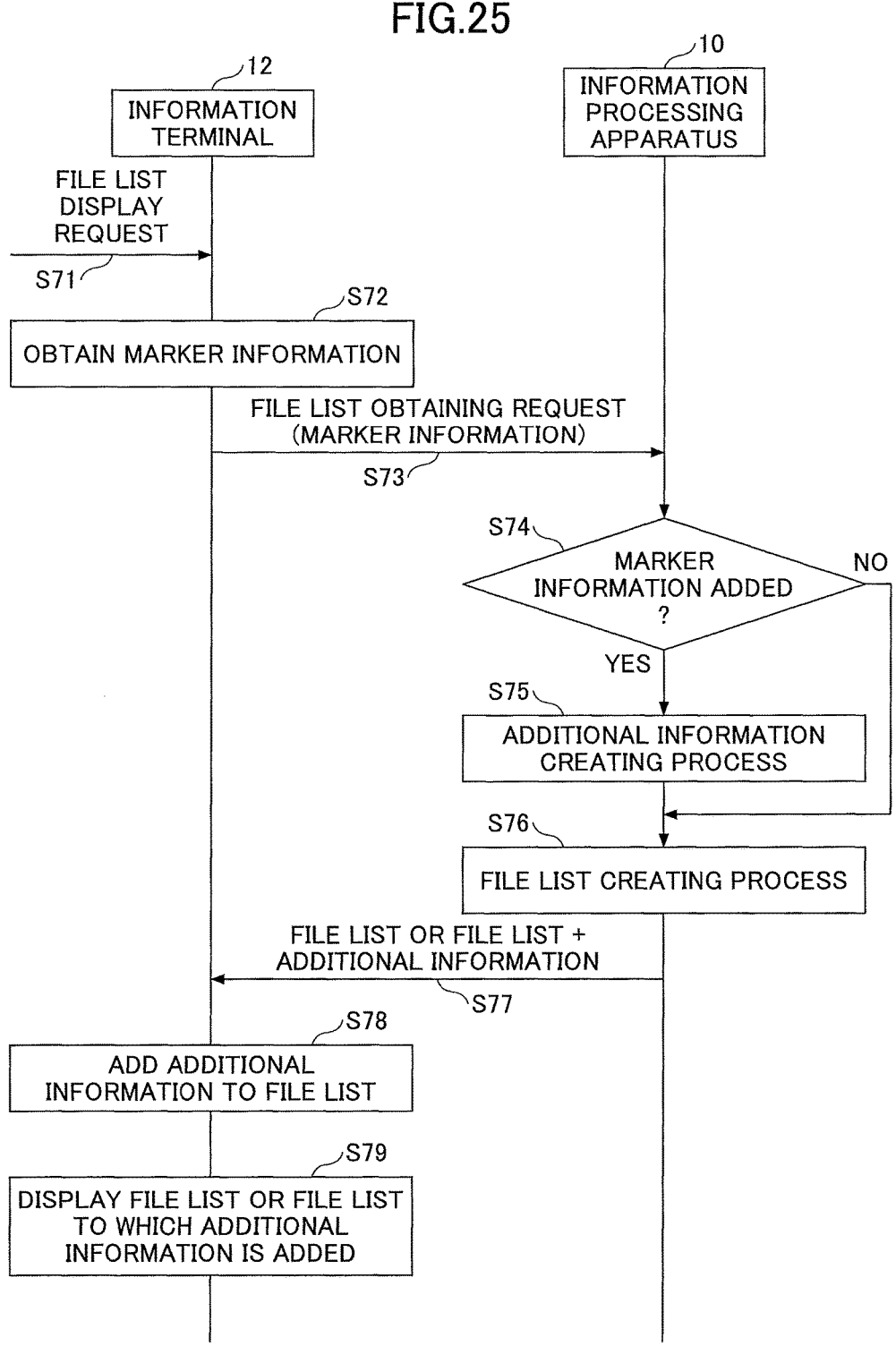

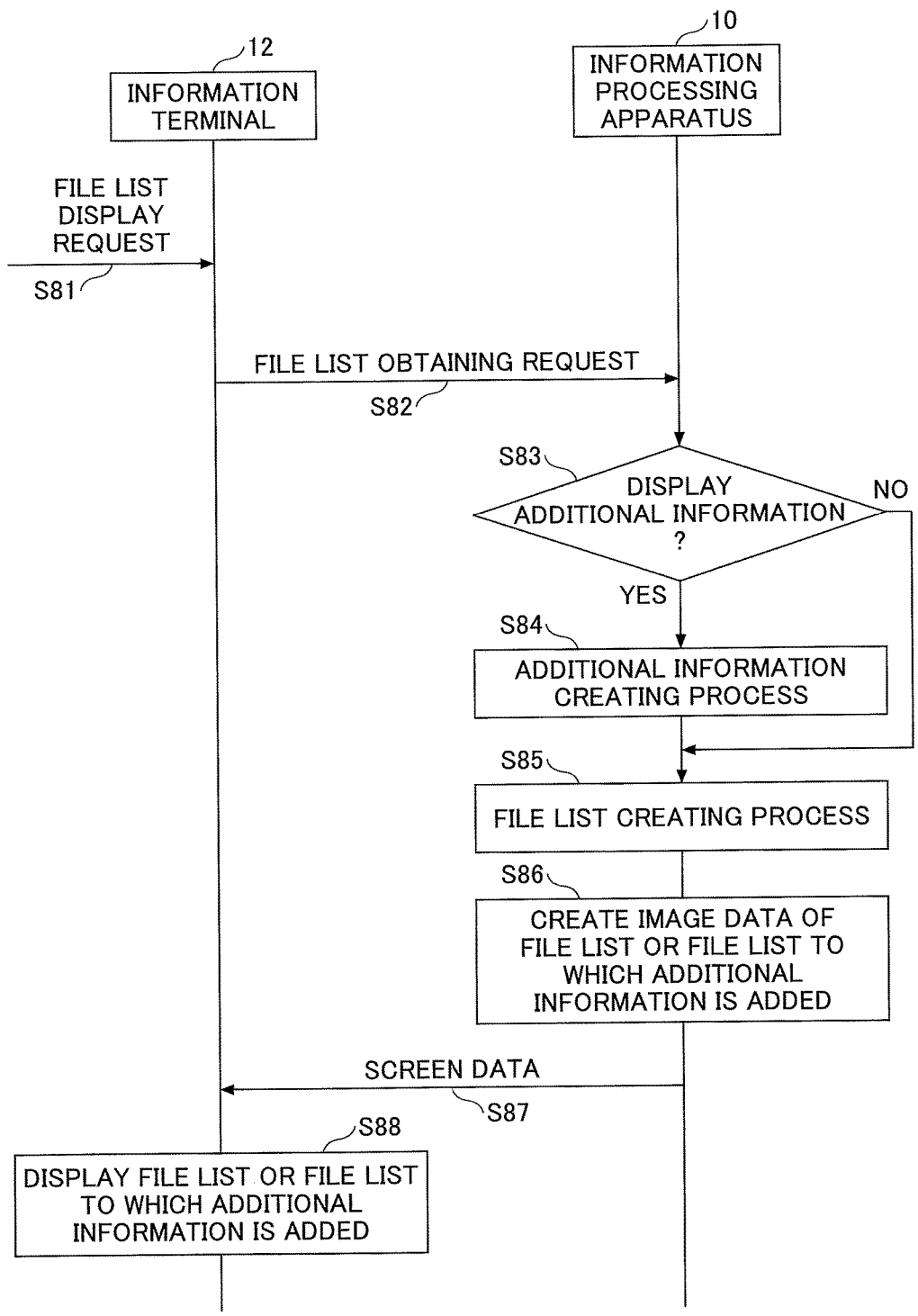

INFORMATION PROCESSING SYSTEM AND METHOD FOR DISPLAYING LIST OF FILES

CROSS-REFERENCE TO RELATED APPLICATION

The present application claims priority under 35 U.S.C. § 119 to Japanese Patent Application No. 2015-150467, filed on Jul. 30, 2015. The contents of which are incorporated herein by reference in their entirety.

BACKGROUND OF THE INVENTION

1. Field of the Invention

The present disclosure relates to information processing systems and methods.

2. Description of the Related Art

There are file list display methods by which files stored in a storage device are displayed in a list on personal computers (PCs) or smart devices.

For example, Japanese Unexamined Patent Application Publication No. 7-182214 describes a file list display method by which files are displayed in a list with display colors corresponding to the data formats of the files to make it possible to select a file having a desired data format from among multiple kinds of recorded files having different formats.

SUMMARY OF THE INVENTION

According to an aspect of the present invention, an information processing system includes an information processing apparatus including a first processor configured to execute a first program to implement a first part of an information processing process, and one or more information terminals each including a second processor configured to execute a second program to implement a second part of the information processing process. The information processing process includes obtaining a list of one or more files stored in a storage and marker information correlating a marker with a corresponding process, adding additional information obtained by the process corresponding to the marker to the list in response to determining that the marker is included in a name of a file included in the list, and displaying the list to which the additional information is added on one of the one or more information terminals.

BRIEF DESCRIPTION OF THE DRAWINGS

FIG. 6 is a diagram depicting marker information according to the first embodiment;

FIG. 8 is a diagram depicting a file list screen to which additional information is added according to the first embodiment;

FIG. 12 is a diagram depicting another file list screen to which additional information is added according to the first embodiment;

FIG. 13 is a diagram depicting another configuration of the marker information according to the first embodiment;

FIG. 16 is a diagram depicting a position list table according to the first embodiment;

FIG. 17 is a diagram depicting a process list table according to the first embodiment;

FIG. 18 is a diagram depicting a display form list table according to the first embodiment;

FIG. 19 is a diagram depicting file list screens in which different items of additional information are added to the same folder according to the first embodiment;

FIG. 23 is a diagram depicting an additional information display necessity/non-necessity table according to the second embodiment;

FIG. 24 is a diagram illustrating that a file list screen displayed on the information terminal differs depending on information as to whether to display additional information in the additional information display necessity/non-necessity table according to the second embodiment;

FIG. 25 is a sequence diagram depicting a file list displaying process according to a third embodiment; and FIG. 26 is a sequence diagram depicting a file list displaying process according to a fourth embodiment.

DESCRIPTION OF THE EMBODIMENTS

According to conventional file list display methods, specific items obtained by a file list display request, such as a filename, an update date and time, and size, are displayed, but there is a problem in that the displayed specific items are common to all files.

An embodiment of the present invention has an object of providing an information processing system and method that make it possible to determine, with respect to each file, additional information to be added to and displayed in a file list.

According to an embodiment of the present invention, an information processing system and method that make it possible to determine, with respect to each file, additional information to be added to and displayed in a file list are provided.

According to an embodiment of the present invention, additional information to be added to and displayed in a file list can be determined file by file.

Embodiments of the present invention are described below.

First Embodiment

Figure 1:
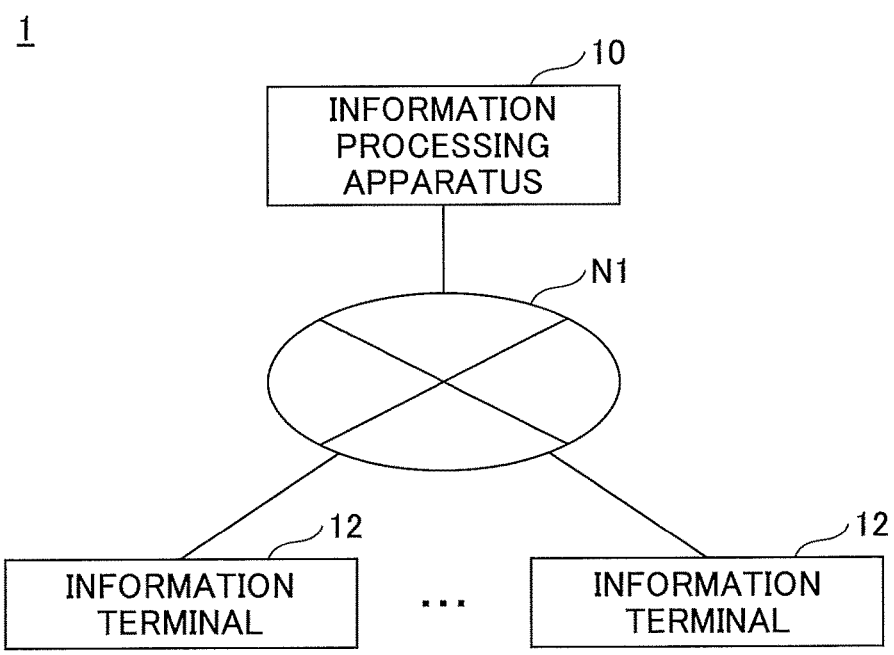
FIG. 1 is a diagram depicting a configuration of an information processing system according to a first embodiment.

FIG. 1 is a diagram depicting a configuration of an information processing system according to a first embodiment. Referring to FIG. 1, an information processing system 1 includes a network N1 such as a wired or wireless local area network (LAN).

The information processing system 1 further includes an information processing apparatus 10 and one or more information terminals 12, which are connected by the network N1. The one or more information terminals 12 may be hereinafter collectively referred to as "information terminal 12". The information terminal 12 is an electronic apparatus such as a PC, a tablet terminal, or a portable terminal, on which a file list is displayed by a user. The information terminal 12 may also be an electronic apparatus such as a multifunction peripheral, a printer, a projector, or a scanner that is capable of displaying a file list.

The information processing apparatus 10 includes a file server function to provide a file list or transmit or receive a file in response to a request from the information terminal 12. The information processing apparatus 10 obtains, provides, and manages information on stored files and folders. According to this embodiment, the information processing apparatus 10 uses a folder as a storage area for sorting and organizing files. The storage area, however, is not limited to a folder, and may be any storage area that presents the same concept, such as a directory.

The information terminal 12 may access the information processing apparatus 10 through the network N1 to display a file list provided by the information processing apparatus 10, store a file in the information processing apparatus 10, and view a file received from the information processing apparatus 10. The information processing system 1 is not limited to the configuration depicted in FIG. 1. For example, the information processing apparatus 10 may be implemented by multiple computers.

Figure 2:
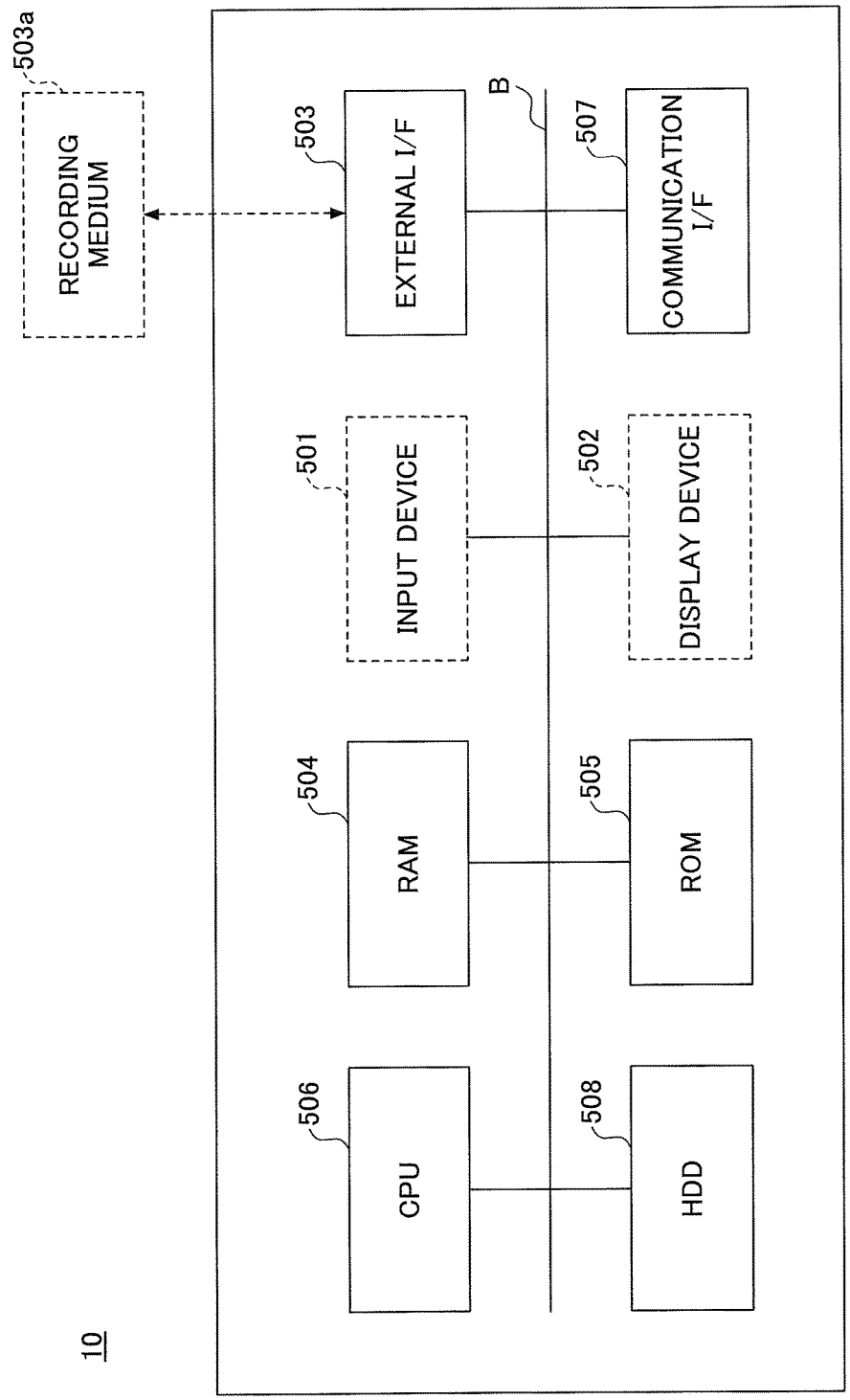
FIG. 2 is a block diagram depicting a hardware configuration of an information processing apparatus according to the first embodiment.

FIG. 2 is a block diagram depicting a hardware configuration of an information processing apparatus according to this embodiment. The information processing apparatus 10 may be implemented with a hardware configuration as depicted in FIG. 2.

Referring to FIG. 2, the information processing apparatus 10 includes an input device 501, a display device 502, an external interface (I/F) 503, a random access memory (RAM) 504, a read-only memory (ROM) 505, a central processing unit (CPU) 506, a communication I/F 507, and a hard disk drive (HDD) 508, all of which are interconnected by a bus B. The input device 501 and the display device 502 are optional, and may be connected to the information processing apparatus 10 to be used on an as-needed basis.

The input device 501 includes a keyboard, a mouse, and a touchscreen. A user uses the input device 501 to input various operation signals. The display device 502 includes a display, and displays the results of processing by the information processing apparatus 10.

The communication I/F 507 connects the information processing apparatus 10 to various networks to enable the information processing apparatus 10 to perform data communications through the communication I/F 507.

The HDD 508 is a nonvolatile storage device containing programs and data. The contained programs and data include an operating system (OS), which is basic software performing overall control of the information processing apparatus 10, and application software (hereinafter simply referred to as "application") that provides various functions on the OS.

The information processing apparatus 10 may use a drive unit that uses a flash memory as a storage medium, such as a solid state drive (SSD), in place of the HDD 508.

The external I/F 503 is an interface with external apparatuses such as a recording medium 503a. The external I/F 503 enables the information processing apparatus 10 to read and/or write to the recording medium 503a through the external I/F 503. The recording medium 503a may be, for example, a flexible disk, a compact disk (CD), a Secure Digital (SD) memory card, or a universal serial bus (USB) memory.

The ROM 505 is a nonvolatile semiconductor memory (storage device) capable of retaining programs and data even after power is turned off. The ROM 505 contains programs and data such as a basic input/output system (BIOS), which is executed at the startup of the information processing apparatus 10, OS configuration data, and network configuration data. The RAM 504 is a volatile semiconductor memory (storage device) that temporarily retains programs and data.

The CPU 506 is a processor that reads programs and data from a storage device such as the ROM 505 or the HDD 508 into the RAM 504 and executes processing to perform overall control and functions of the information processing apparatus 10. The information processing apparatus 10 may have a hardware configuration as depicted in FIG. 2 to implement various processes as described below.

Figure 3:
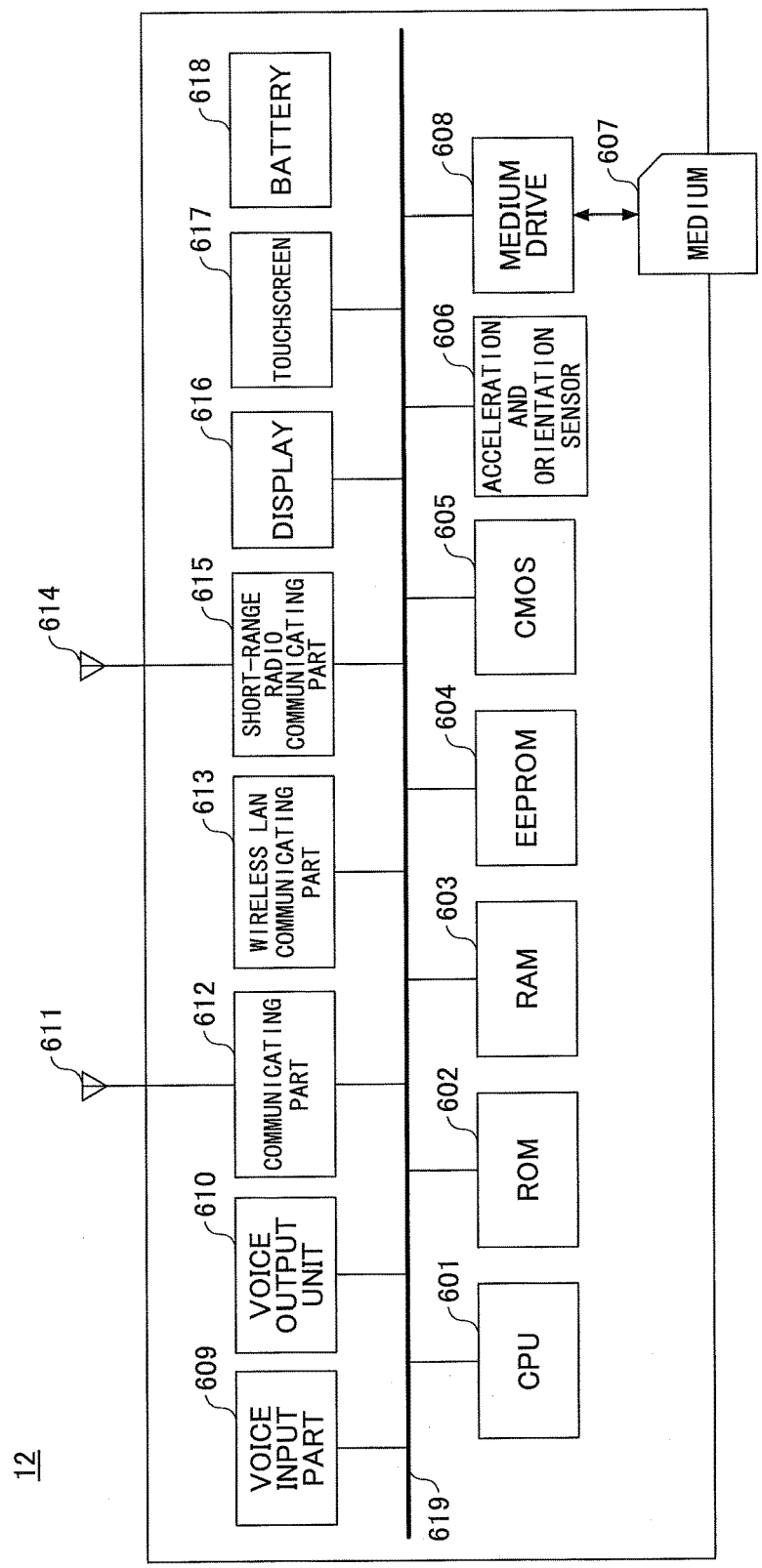
FIG. 3 is a block diagram depicting a hardware configuration of an information terminal according to the first embodiment.

FIG. 3 is a block diagram depicting a hardware configuration of an information terminal according to this embodiment. The information terminal 12 may be implemented with a hardware configuration as depicted in FIG. 3. Referring to FIG. 3, the information terminal 12 includes a CPU 601, a ROM 602, a RAM 603, an electrically erasable programmable ROM (EEPROM) 604, a complementary metal-oxide-semiconductor (CMOS) sensor 605, an acceleration and orientation sensor 606, and a medium drive 608.

The CPU 601 performs overall control of the information terminal 12. The ROM 602 contains a basic input/output program. The RAM 603 is used as a work area for the CPU 601. The EEPROM 604 allows data to be read from or written to the EEPROM 604 in accordance with the control of the CPU 601. The CMOS sensor 605 captures an image of an object to obtain image data in accordance with the control of the CPU 601. The acceleration and orientation sensor 606 includes, for example, at least one of an electromagnetic compass that detects geomagnetism and a gyrocompass, and an acceleration sensor.

The medium drive 608 controls reading data from or writing data to (storing data in) a recording medium 607 such as a flash memory. The recording medium 607 allows recorded data to be read from and new data to be written to and stored in the recording medium 607. The recording medium 607 is attachable to and detachable from the medium drive 608.

The EEPROM 604 contains association information for the OS and network configuration executed by the CPU 601. The EEPROM 604 or the recording medium 607 contains an application for executing various processes according to embodiments of the present invention.

The CMOS sensor 605 is a solid state image sensor that converts light into an electrical charge to digitize an image of an object. The CMOS sensor 605 may be replaced with, for example, a charge-coupled device (CCD) as long as an image of an object can be captured.

The information terminal 12 further includes a voice input part 609, a voice output part 610, an antenna 611, a communicating part 612, a wireless LAN communicating part 613, a short-range communicating antenna 614, a short-range radio communicating part 615, a display 616, and a touchscreen 617, all of which are electrically interconnected by a bus line 619 such as an address bus or a data bus.

The voice input part 609 converts a voice into a voice signal. The voice output part 610 converts a voice signal into a voice. The communicating part 612 uses the antenna 611 to perform communications with the nearest base station device through radio communication signals. The wireless LAN communicating part 613 performs radio LAN communications compliant with the Institute of Electrical and Electronics (IEEE) 802.11 standards with access points. The short-range radio communicating part 615 uses the short-range radio communicating antenna 614 to perform short-range radio communications.

The display 616 is, for example, a liquid crystal or organic electroluminescence (EL) display that displays an image of an object and various icons. The touchscreen 617 is placed on the display 616. The touchscreen 617 includes a pressure-sensitive or electrostatic screen to detect a touch position on the display 616 in response to a touch event of a finger or a stylus.

The information terminal 12 includes a dedicated battery 618. The information terminal 12 is driven with the battery 618. The voice input part 609 includes a microphone for inputting a voice. The voice output part 610 includes a loudspeaker for outputting a voice.

The information terminal 12 may have a hardware configuration as depicted in FIG. 3 to implement various processes as described below. A description of a hardware configuration of the information terminal 12 in the case where the information terminal 12 is an electronic apparatus such as a multifunction peripheral, a printer, a projector, or a scanner is omitted.

Figure 4:
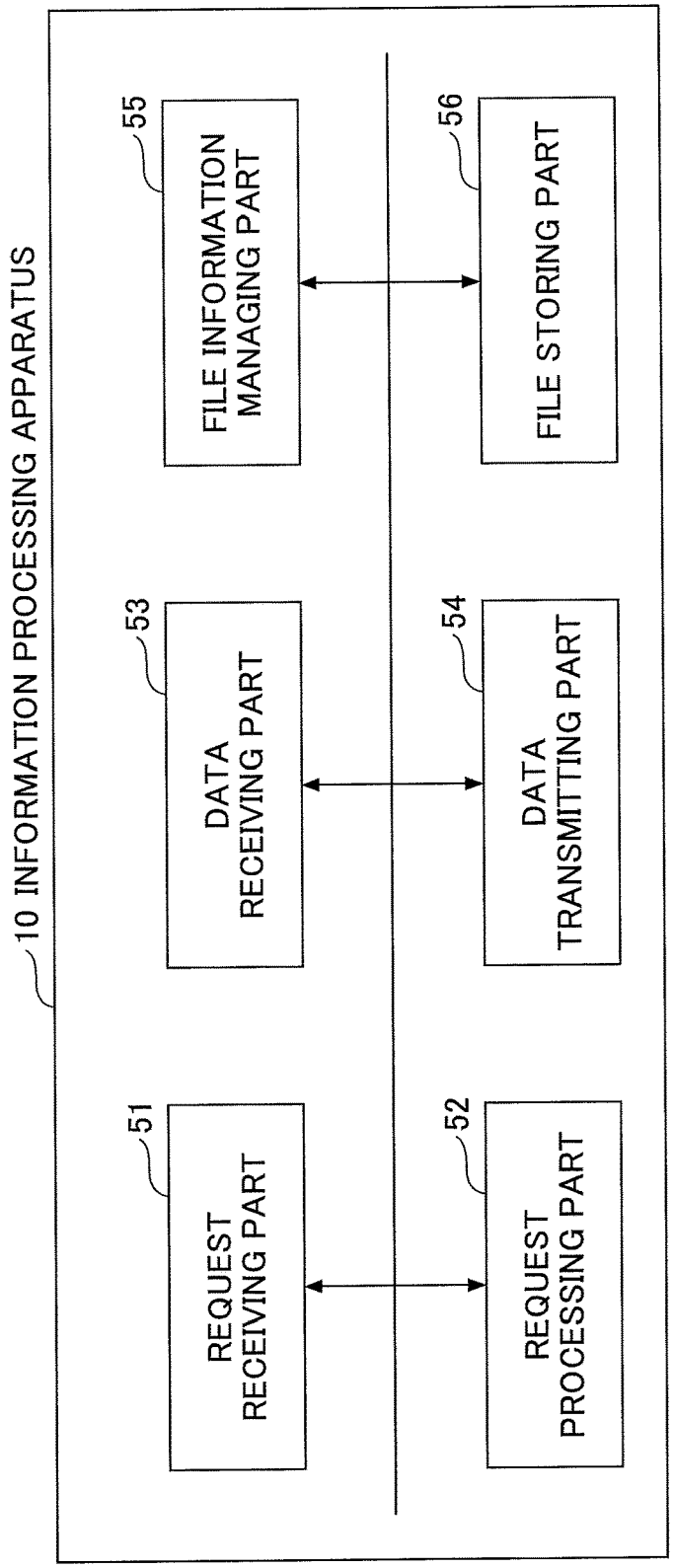
FIG. 4 is a diagram depicting process blocks of the information processing apparatus according to the first embodiment.

FIG. 4 is a diagram depicting process blocks of an information processing apparatus according to this embodiment. The information processing apparatus 10 may be implemented with process blocks as depicted in FIG. 4. For example, the information processing apparatus 10 executes a program to implement a request receiving part 51, a request processing part 52, a data receiving part 53, a data transmitting part 54 (a transmitting part), a file information managing part 55, and a file storing part 56.

The request receiving part 51 receives a request from the information terminal 12. The request processing part 52 processes a request received from the information terminal 12 by the request receiving part 51. The data receiving part 53 receives various data such as files.

The data transmitting part 54 transmits various data such as a file list and files. The file information managing part 55 manages the information of files and folders stored in a storage by the file storing part 56. The file storing part 56 stores files and folders.

Figure 5:
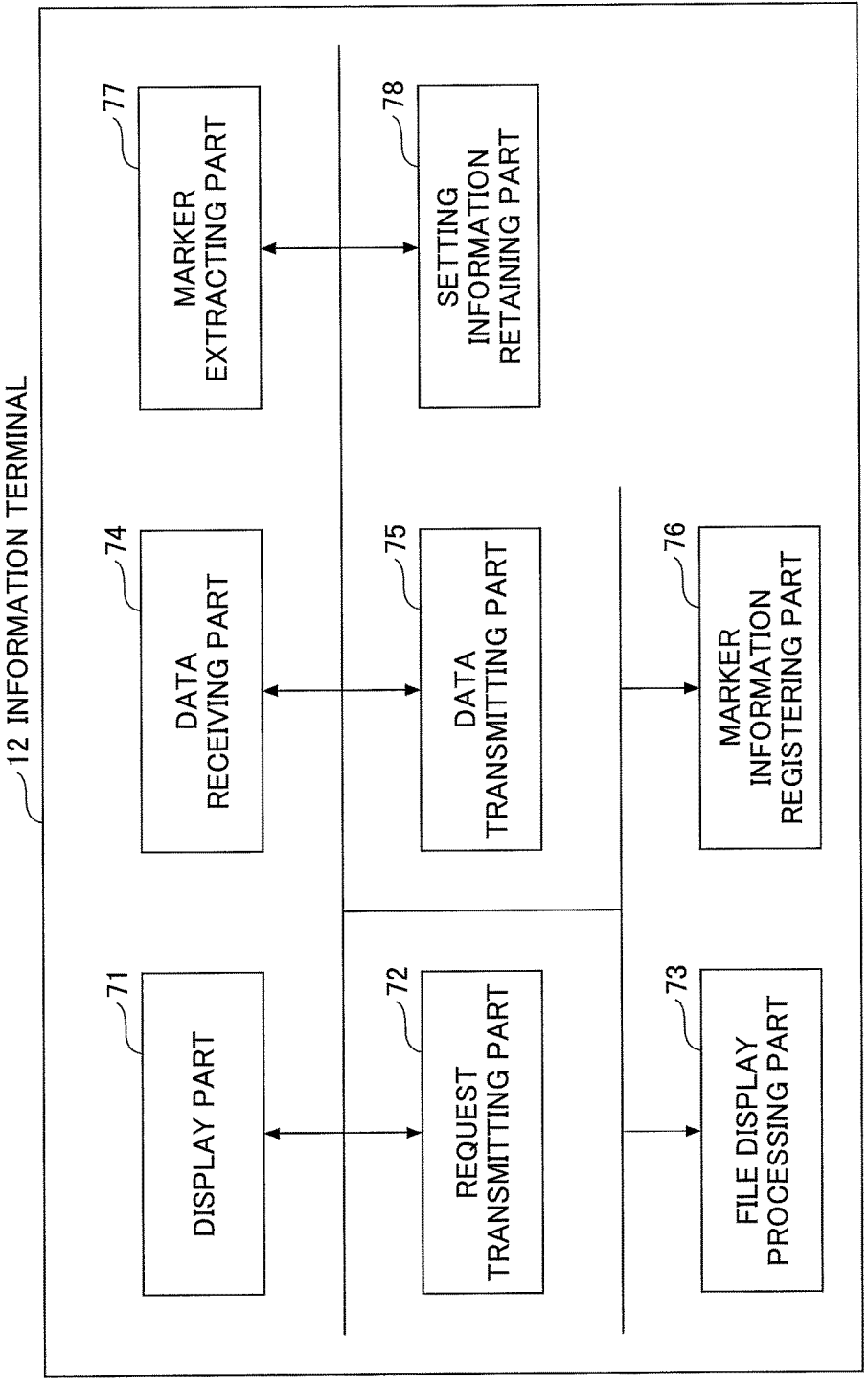
FIG. 5 is a diagram depicting process blocks of the information terminal according to the first embodiment.

FIG. 5 is a diagram depicting process blocks of an information terminal according to this embodiment. The information terminal 12 may be implemented with process blocks as depicted in FIG. 5. The information terminal 12 executes a program to implement a display part 71, a request transmitting part 72, a file display processing part 73, a data receiving part 74 (a receiving part), a data transmitting part 75, a marker information registering part 76, a marker extracting part 77, and a setting information retaining part 78 (a retaining part).

The display part 71 displays various data such as a file list and files to a user. The request transmitting part 72 transmits various requests such as a request to obtain a file list (a file list obtaining request) to the information processing apparatus 10. The file display processing part 73 performs processing to cause the display part 71 to display a file list or files.

The data receiving part 74 receives various data such as a file list and files. The data transmitting part 75 transmits various data such as files. The marker information registering part 76 registers marker information for which a registration request has been received from a user with the setting information retaining part 78.

The marker extracting part 77 extracts a marker from an obtained file list, executes a process corresponding to the extracted marker to add additional information to a file or a folder, and causes the file display processing part 73 to display the file list to which the additional information is added. The setting information retaining part 78 retains the below-described marker information in which markers and processes corresponding to the markers are set. The marker information retained by the setting information retaining part 78 may differ from information terminal 12 to information terminal 12 or may be common to the information terminals 12.

FIG. 6 is a diagram depicting marker information retained in the setting information retaining part 78. Referring to FIG. 6, the marker information includes the items of MARKER, POSITION, PROCESS, and DISPLAY FORM.

The item of MARKER specifies a marker by a symbol, characters, or numbers. For example, in the case depicted in FIG. 6, symbols "■", "□", and "▲", character strings "(shared)" and "[p]", and an extension "jpg" are markers. Markers may be combinations of two or more of symbols, characters, and numbers.

The item of POSITION specifies the position of a marker. For example, in the case depicted in FIG. 6, the beginning of a filename (folder name), the end of a filename (folder name), and an extension are the positions of markers. Markers may be included in filenames or folder names if the positions of the markers are not specified.

The item of PROCESS specifies a process corresponding to a file or a folder in which a marker is included. In the case depicted in FIG. 6, counting the number of files in a folder, calculating the total size of files in a folder, obtaining the filename of the latest file of the files in a folder, obtaining a last-updated-by user, obtaining the number of pages, and obtaining the number of pixels are processes. Processes are executed by the information processing apparatus 10.

The item of DISPLAY FORM specifies the form of displaying the result of a process corresponding to a file or a folder. In the case depicted in FIG. 6, a badge and showing in a list are display forms. The badge is a number displayed on a folder icon. According to the marker information of FIG. 6, for example, the counted number of files in a folder is shown in a badge, and the filename of the latest file of the files in a folder is shown in a file list.

Accordingly, for example, the first record of the marker information of FIG. 6 indicates that the number of files in a folder whose name includes the marker "■" at the beginning is counted and the counted number of files is shown in a badge.

Thus, according to the marker information of FIG. 6, additional information to be added to and displayed in a file list, such as the number of files in a folder and a last-updated-by user (who updated a file last), can be determined file by file or folder by folder.

A process executed by the information processing system 1 according to this embodiment is described below.

Figure 7:
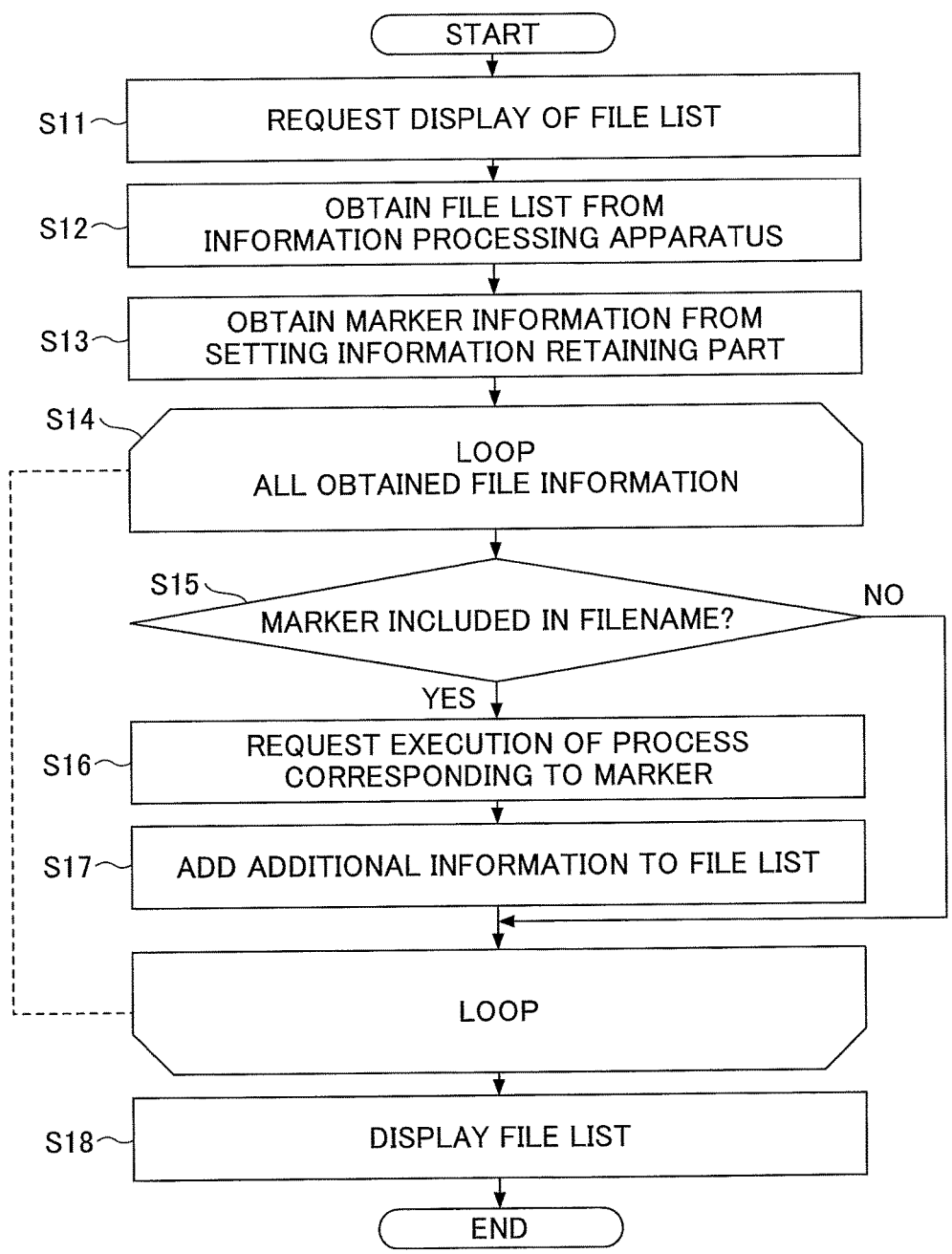
FIG. 7 is a flowchart depicting a file list displaying process executed by the information terminal according to the first embodiment.

FIG. 7 is a flowchart depicting a file list displaying process executed by an information terminal according to this embodiment. According to the information processing system 1 of this embodiment, the information terminal 12 displays a list of files (a file list) by the procedure depicted in FIG. 7, for example.

At step S11, the information terminal 12 receives a user's file list display request (to display a file list) through the touchscreen 617, for example. At step S12, the request transmitting part 72 of the information terminal 12 transmits a request to obtain a file list (a file list obtaining request) to the information processing apparatus 10. The data receiving part 74 receives a file list from the information processing apparatus 10. At step S13, the marker extracting part 77 obtains marker information as depicted in FIG. 6 from the setting information retaining part 78.

At step S14, the marker extracting part 77 executes the process of step S15, and the process of steps S16 and S17 in the case of "YES" at step S15, on each folder and file included in the obtained file list. At step S15, the marker extracting part 77 compares the marker information of FIG. 6 and a filename or a folder name included in the file list to determine whether a marker is included in the filename or the folder name.

If the marker is included (YES at step S15), at step S16, the request transmitting part 72 refers to the marker information of FIG. 6 to request the information processing apparatus 10 to execute a process corresponding to the included marker. The data receiving part 74 receives additional information that is the result of the process as a response to the request. At step S17, the file display processing part 73 adds the additional information to the file list. If no marker is included (NO at step S15), the marker extracting part 77 skips steps S16 and S17.

Then, after executing the process of step S15 or the process of steps S15 through S17 on each folder and file included in the file list, at step S18, the file display processing part 73 displays the file list to which the additional information is added as depicted by way of example in FIG. 8 on the display 616.

FIG. 8 is a diagram depicting a file list screen to which additional information is added. The file list screen depicted in FIG. 8 is displayed in response to a file list display request made in the information terminal 12 with which the marker information of FIG. 6 is registered.

The file list screen of FIG. 8 includes folders of "□ RECEIVED FAX DOCUMENTS", "MEETING MINUTES", "▲ MANUALS", and "□ TEST DATA" and files of "image1.jpg", "image2.jpg", "WBS(shared).xlsx", and "[p] APPLICATION.pdf".

The folder "■ RECEIVED FAX DOCUMENTS" has the marker "■" added to the beginning of the folder name. Therefore, the number of files in the folder counted by the process "counting the number of files in a folder" corresponding to the marker "■", namely, "55", is displayed in the corresponding display form of "badge" on the folder icon.

Thus, a user can add the marker "■" to the beginning of the folder name to easily understand how many received facsimile (FAX) documents are stored in the folder "RECEIVED FAX DOCUMENTS".

No additional information is displayed for the folder "MEETING MINUTES" because no marker is added to the folder name. Thus, a user may also add no marker to the folder "MEETING MINUTES" that requires no additional information to prevent additional information from being displayed with respect to the folder "MEETING MINUTES".

The folder "▲ MANUALS" has the marker "▲" added to the beginning of the folder name. Therefore, the filename of the latest file in the folder, obtained by the process "obtaining the filename of the latest file of the files in a folder" corresponding to the marker "▲", is displayed in the display form of "displaying in a list" with respect to the folder "▲ MANUALS".

Thus, a user can add the marker "▲" to the beginning of the folder "MANUALS" to easily understand the filename of the latest file stored in the folder "MANUALS".

The folder "□ TEST DATA" has the marker "□" added to the beginning of the folder name. Therefore, the total size of the files in the folder, calculated by the process "calculating the total size of files in a folder" corresponding to the marker "□", namely, "142 MB", is displayed in the display form of "badge". Thus, a user can add the marker "□" to the beginning of the folder "□ TEST DATA" to easily understand the sizes of the files in the folder "□ TEST DATA".

The file "image1.jpg" has the extension "jpg" serving as a marker. Therefore, the number of pixels "800×600" obtained by the process "obtaining the number of pixels" corresponding to the marker "jpg" is displayed in the display form of "displaying in a list" with respect to the file "image1.jpg". The file "image2.jpg" has the extension "jpg" serving as a marker. Therefore, the number of pixels "1280× 720" obtained by the process "obtaining the number of pixels" corresponding to the marker "jpg" is displayed in the display form of "displaying in a list" with respect to the file "image2.jpg". Thus, a user can easily understand the number of pixels of a file whose extension is "jpg".

The file "WBS(shared).xlsx" has the marker "(shared)" added to the end of the filename. Therefore, a last-updated-by user "JOHN" obtained by the process "obtaining a last-updated-by user" corresponding to the marker "(shared)" is displayed in the display form of "displaying in a list" with respect to the file "WBS(shared).xlsx".

Thus, a user can add the marker "(shared)" to the end of, for example, a file shared and edited by multiple persons to easily understand who last edited the file.

The file "[p]APPLICATION.pdf" has the marker "[p]" added to the beginning of the filename. Therefore, the number of pages "4" obtained by the process "obtaining the number of pages" corresponding to the marker "[p]" is displayed in the display form of "displaying in a list" with respect to the file "[p]APPLICATION.pdf". Thus, a user can add the marker "[p]" to the beginning of, for example, a file to print to easily understand the number of pages of the file.

Thus, adding a marker to a folder or a file makes it possible for the information terminal 12 of this embodiment to display a file list screen to which desired additional information is added even when additional information desired to be added to the file list screen differs from folder to folder or from file to file.

Figure 9:
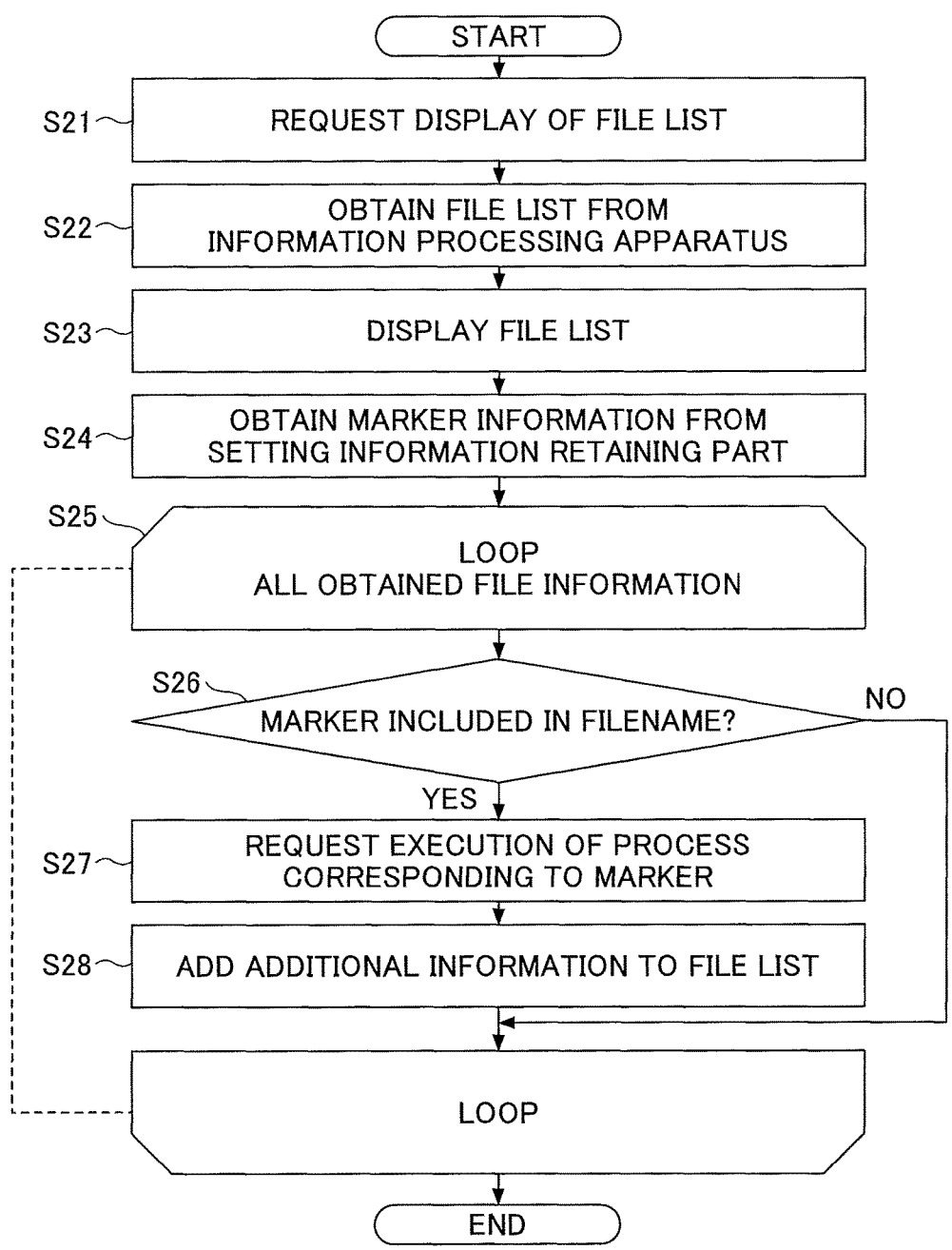
FIG. 9 is a flowchart depicting another file list displaying process executed by the information terminal according to the first embodiment.

FIG. 9 is a flowchart depicting another file list displaying process executed by an information terminal according to this embodiment. According to the file list displaying process depicted in FIG. 7, the information terminal 12 displays a file list screen to which additional information is added. Alternatively, the information terminal 12 may, for example, display a file list screen and thereafter add additional information items to the file list screen one item after another as depicted in FIG. 9.

At step S21, the information terminal 12 receives a user's file list display request through the touchscreen 617, for example. At step S22, the request transmitting part 72 of the information terminal 12 transmits a file list obtaining request to the information processing apparatus 10.

The data receiving part 74 receives a file list from the information processing apparatus 10. At step S23, the file display processing part 73 displays the file list obtained from the information processing apparatus 10 on the display 616. According to the file list displaying process of FIG. 9, the information terminal 12 displays the file list on the display 616 before executing the process of step S26, and the process of steps S27 and S28 in the case of "YES" at step S26, on each folder and file included in the file list.

At step S24, the marker extracting part 77 obtains marker information as depicted in FIG. 6 from the setting information retaining part 78. At step S25, the marker extracting part 77 executes the process of step S26, and the process of steps S27 and S28 in the case of "YES" at step S26, on each folder and file included in the file list displayed at step S23.

At step S26, the marker extracting part 77 compares the marker information of FIG. 6 and a filename or a folder name included in the file list to determine whether a marker is included in the filename or the folder name. If the marker is included (YES at step S26), at step S27, the request transmitting part 72 refers to the marker information of FIG. 6 to request the information processing apparatus 10 to execute a process corresponding to the included marker. The data receiving part 74 receives additional information that is the result of the process as a response to the request.

At step S28, the file display processing part 73 adds the additional information to the file list displayed on the display 616. If no marker is included (NO at step S26), the marker extracting part 77 skips steps S27 and S28.

Figure 10:
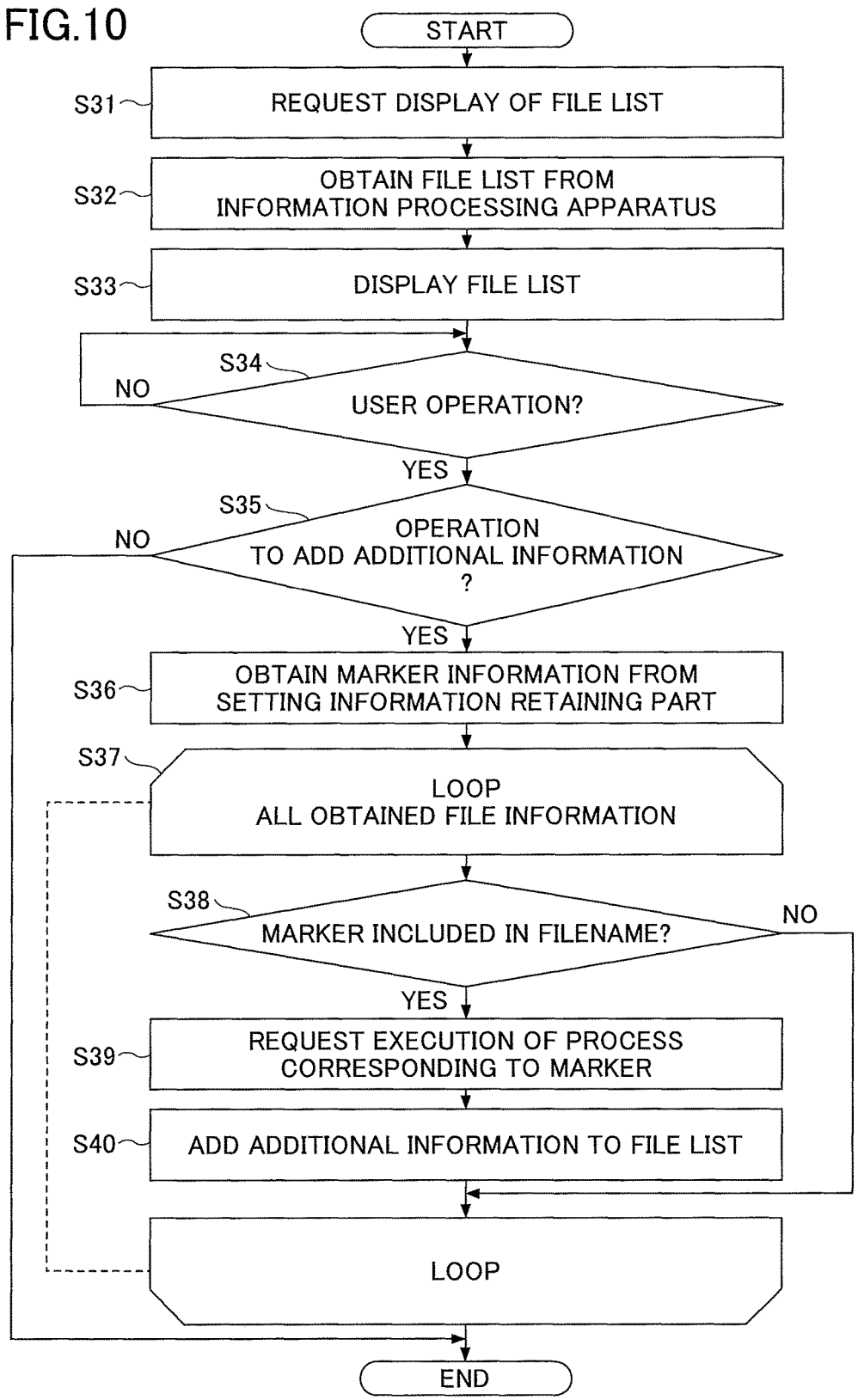
FIG. 10 is a flowchart depicting yet another file list displaying process executed by the information terminal according to the first embodiment.

FIG. 10 is a flowchart depicting another file list displaying process executed by an information terminal according to this embodiment. For example, the information terminal 12 may alternatively display a file list screen and thereafter wait for a user's operation to add additional information as depicted in FIG. 10. The flowchart of FIG. 10 is the same as the flowchart of FIG. 9 except for some steps. Accordingly, in the following description, a description of the same steps as those of FIG. 9 may be omitted.

The process of steps S31 through S33 is the same as the process of steps S21 through S23 of FIG. 9. After displaying the file list obtained from the information processing apparatus 10 on the display 616, at step S34, the file display processing part 73 waits for a user's operation.

In response to receiving a user's operation, at step S35, the file display processing part 73 determines whether the received user's operation is an operation to add additional information (such as depressing a button for adding additional information). If the user's operation is not an operation to add additional information (NO at step S35), the file display processing part 73 ends the process of the flowchart of FIG. 10, and executes a process according to the user's operation.

Figure 11:
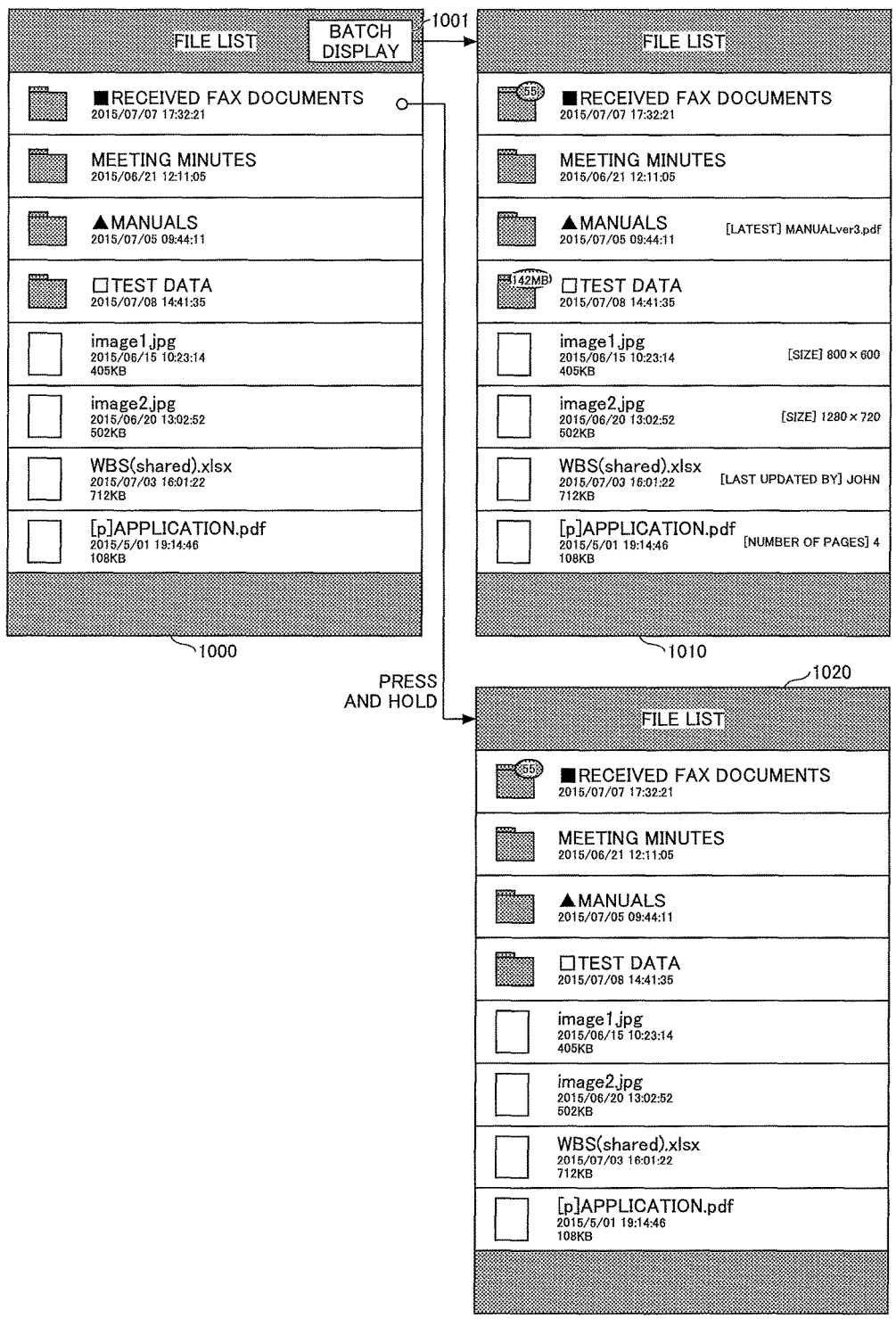
FIG. 11 is a diagram depicting screen transitions in the case of waiting for a user's operation to add additional information after displaying a file list screen according to the first embodiment.

If the user's operation is an operation to add additional information (YES at step S35), the information terminal 12 executes the process of steps S36 through S40, which is the same as the process of steps S24 through S28 of FIG. 9. FIG. 11 is a diagram depicting screen transitions in the case of waiting for a user's operation to add additional information after displaying a file list screen according to this embodiment. Screen transitions as depicted in FIG. 11 are caused by the file list displaying process of FIG. 10.

Referring to FIG. 11, no additional information is added to a file list screen 1000. The file list screen 1000 includes a batch display button 1001. A user may depress the batch display button 1001 to display a file list screen 1010 to which all items of additional information are added together.

Furthermore, a user may press and hold the folder "■ RECEIVED FAX DOCUMENTS" to which to add additional information on the file list screen 1000 to display a file list screen 1020 on which additional information is added to the folder "■ RECEIVED FAX DOCUMENTS".

While the added markers are displayed on the above-described file list screens, a file list screen may be displayed after deletion of markers as depicted in FIG. 12. FIG. 12 is a diagram depicting another file list screen to which additional information is added.

Referring to FIG. 12, the markers added to the folder names and the filenames of the file list screen of FIG. 8 are deleted from a file list screen 1030. Of the markers set in the marker information of FIG. 6, however, the extension is not an added marker and is therefore not deleted to remain in the file list screen 1030. Accordingly, the marker information may include an item that indicates whether a marker is deletable as depicted in FIG. 13.

FIG. 13 is a diagram depicting another configuration of the marker information according to this embodiment. Referring to FIG. 13, the marker information further includes the item of DELETABILITY, in which "YES" indicates that a maker is allowed to be deleted and "NO" indicates that a marker is not allowed to be deleted. The file display processing part 73 may use the marker information of FIG. 13 to display the file list screen 1030 of FIG. 12 from which the markers other than the marker "jpg" are deleted.

Figure 14:
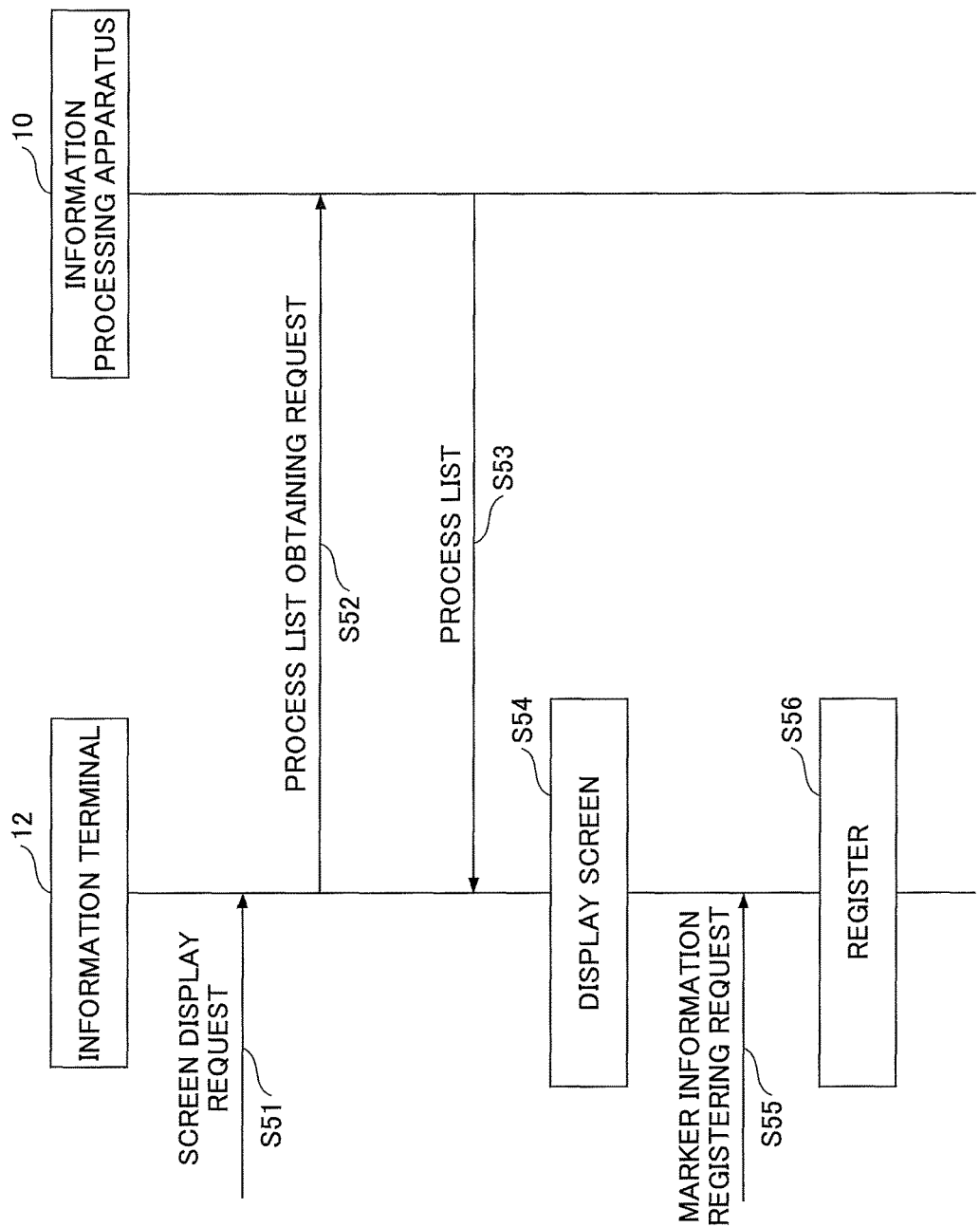
FIG. 14 is a sequence diagram depicting a marker information registering process executed in the information processing system according to the first embodiment.

FIG. 14 is a sequence diagram depicting a marker information registering process executed in an information processing system according to this embodiment. According to the information processing system 1, the marker information may be registered by, for example, the procedure as depicted in FIG. 14.

At step S51, the information terminal 12 receives a user's request to display a marker information registration screen. At step S52, the request transmitting part 72 of the information terminal 12 transmits a request to obtain a process list (a process list obtaining request) to the information processing apparatus 10. The process list requested from the information processing apparatus 10 includes processes to obtain information related to folders and files that may be executed by the information processing apparatus 10.

At step S53, the data receiving part 74 of the information terminal 12 receives a process list from the information processing apparatus 10. At step S54, the marker information registering part 76 of the information terminal 12 causes the display part 71 to display a marker information registration screen as depicted in FIG. 15.

Figure 15:
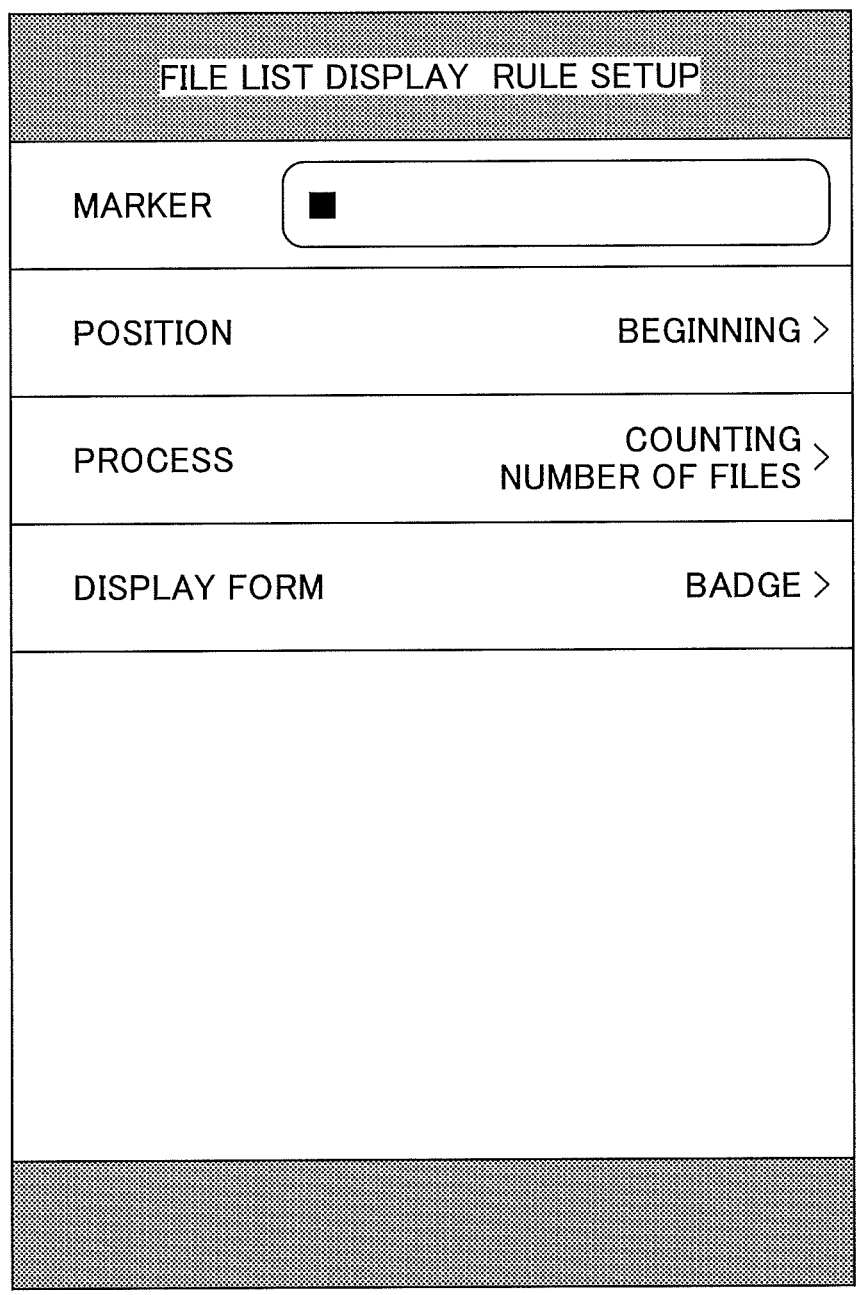
FIG. 15 is a diagram depicting a marker information registration screen according to the first embodiment.

FIG. 15 is a diagram depicting a marker information registration screen according to this embodiment. To create the marker information registration screen of FIG. 15, for example, tables as depicted in FIGS. 16 through 18 are used. FIG. 16 is a diagram depicting a position list table. FIG. 17 is a diagram depicting a process list table. The process list obtained from the information processing apparatus 10 at step S53 is registered with the process list table of FIG. 17. FIG. 18 is a diagram depicting a display form list table. The user may freely combine markers, position, processes, and display forms into marker information through the marker information registration screen as depicted in FIG. 15 to request registration of the marker information.

At step S55, the marker information registering part 76 of the information terminal 12 receives the user's request to register the marker information. At step S56, the marker information registering part 76 registers the marker information with respect to which the marker information registering part 76 has received the registration request with the setting information retaining part 78.

Figure 19:
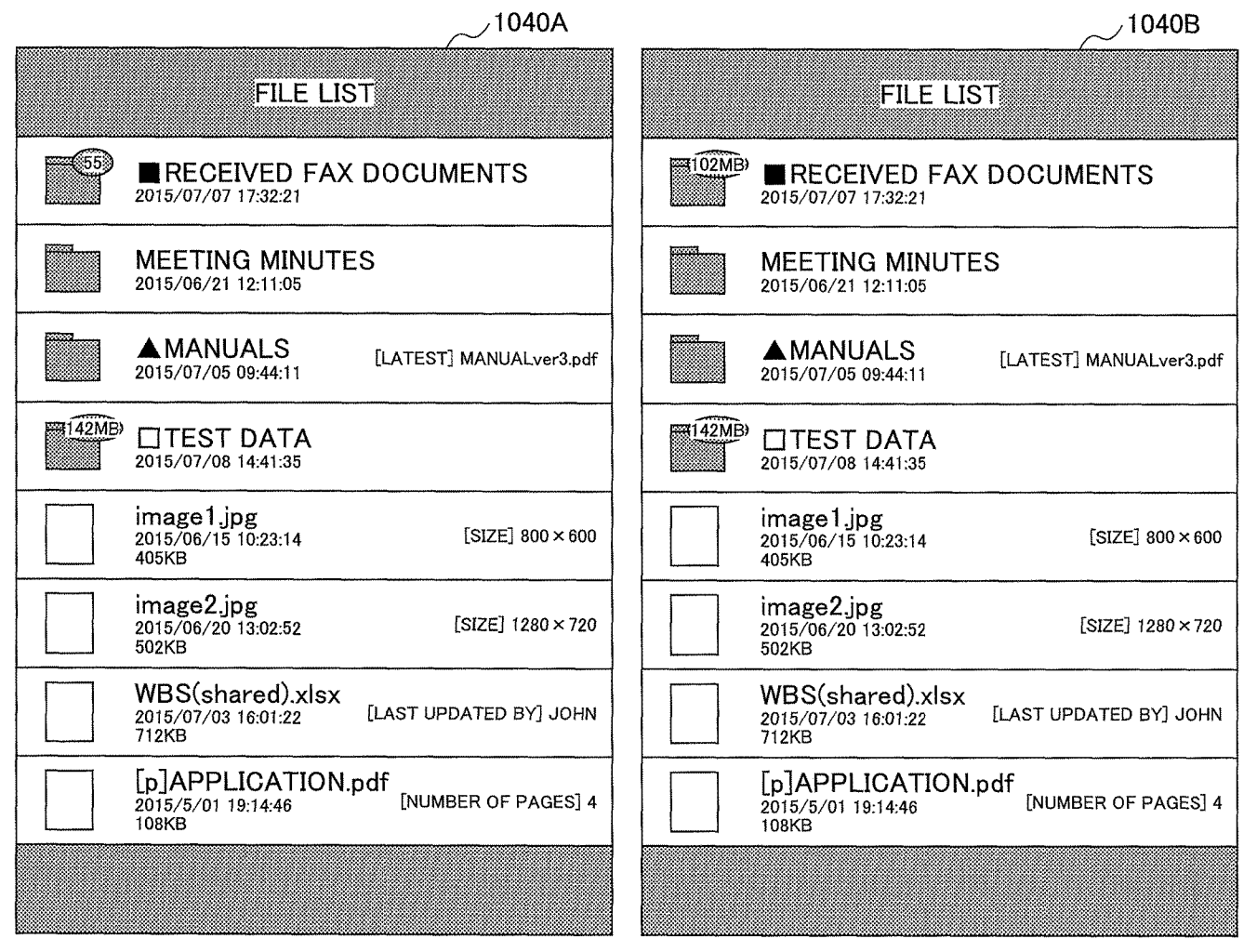

According to the information processing system 1 of this embodiment, making it possible to register marker information user by user makes it also possible to cause additional information to be added to a file list to differ from user to user as depicted in FIG. 19.

FIG. 19 is a diagram depicting file list screens in which different items of additional information are added to the same folder. Referring to FIG. 19, with respect to the folder "■ RECEIVED FAX DOCUMENTS", the number of files in a folder, "55", is shown in the display form of "badge" in a file list screen 1040A, while the total size of files in a folder, "102 MB", is shown in the display form of "badge" in a file list screen 1040B.

Thus, according to the information processing system 1 of this embodiment, making it possible to register marker information user by user enables additional information that differs from user to user to be added to the same folder.

According to the information processing system 1 of this embodiment, it is possible to determine additional information to be added to and displayed in a file list screen folder by folder or file by file. Therefore, it is possible for a user to obtain more information from the file list screen.

Second Embodiment

According to a second embodiment, processing related to marker information executed by the information terminal 12 according to the first embodiment is executed by the information processing apparatus 10. The second embodiment is the same as the first embodiment except for some part. Accordingly, in the following description, differences from the first embodiment are described.

Figure 20:
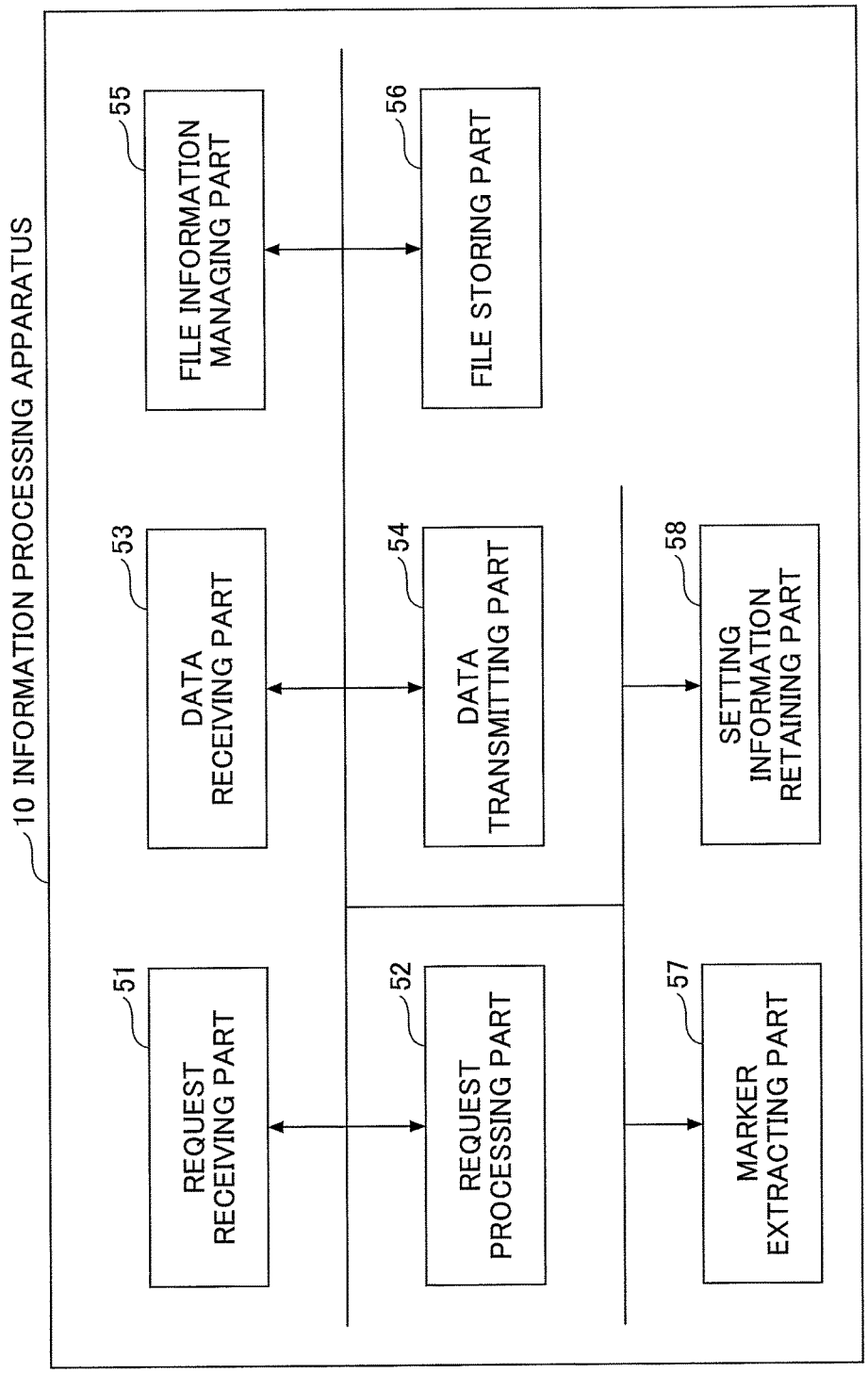
FIG. 20 is a diagram depicting process blocks of the information processing apparatus according to a second embodiment.

FIG. 20 is a diagram depicting process blocks of an information processing apparatus according to the second embodiment. The information processing apparatus 10 according to this embodiment may be implemented with process blocks as depicted in FIG. 20. Referring to FIG. 20, the information processing apparatus 10 according to this embodiment executes a program to implement the request receiving part 51, the request processing part 52, the data receiving part 53, the data transmitting part 54, the file information managing part 55, the file storing part 56, a marker extracting part 57, and a setting information retaining part 58 (a retaining part).

Figure 21:
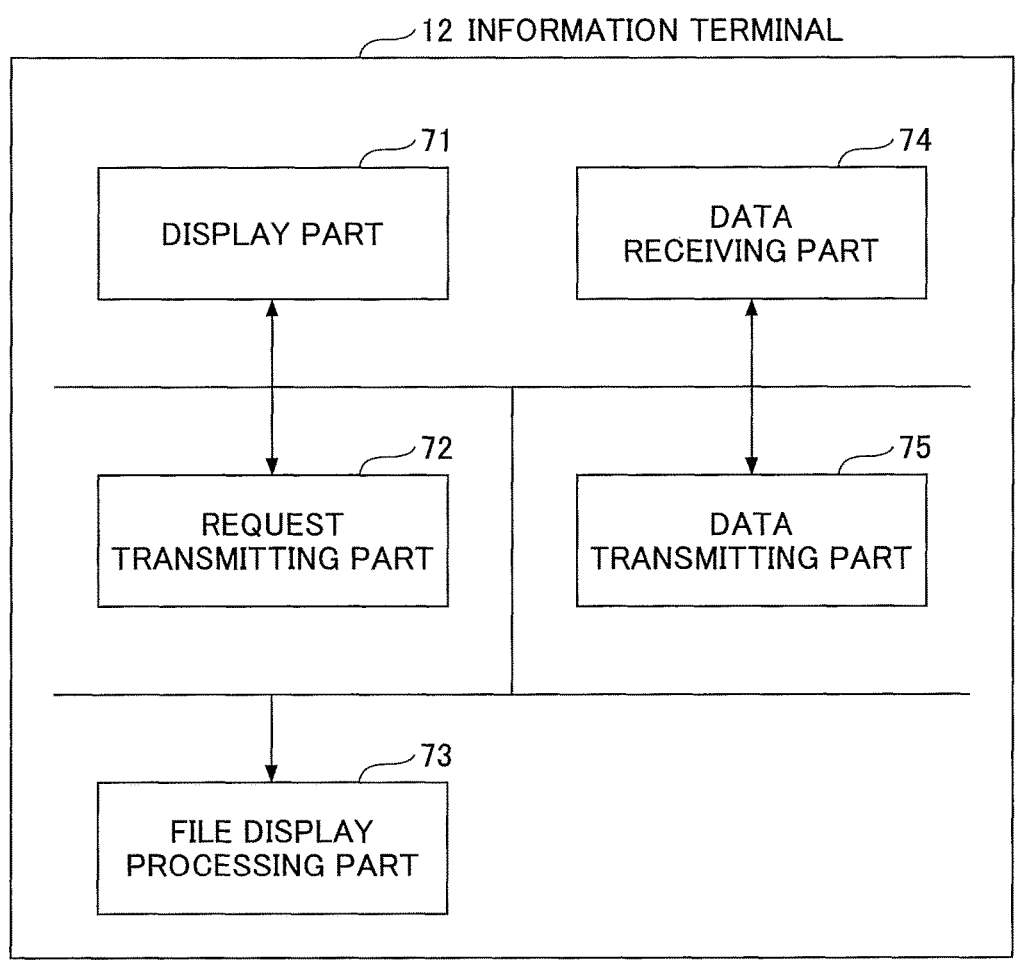
FIG. 21 is a diagram depicting process blocks of the information terminal according to the second embodiment.

FIG. 21 is a diagram depicting process blocks of an information terminal according to the second embodiment. The information terminal 12 according to this embodiment may be implemented with process blocks as depicted in FIG. 21. The information terminal 12 according to this embodiment executes a program to implement the display part 71, the request transmitting part 72, the file display processing part 73, the data receiving part 74, and the data transmitting part 75.

The information processing system 1 according to the second embodiment is different from the information processing system 1 according to the first embodiment in that the information processing apparatus 10 includes the marker extracting part 57 and the setting information retaining part 58 and that the information terminal 12 does not include the marker information registering part 76, the marker extracting part 77, and the setting information retaining part 78.

Figure 22:
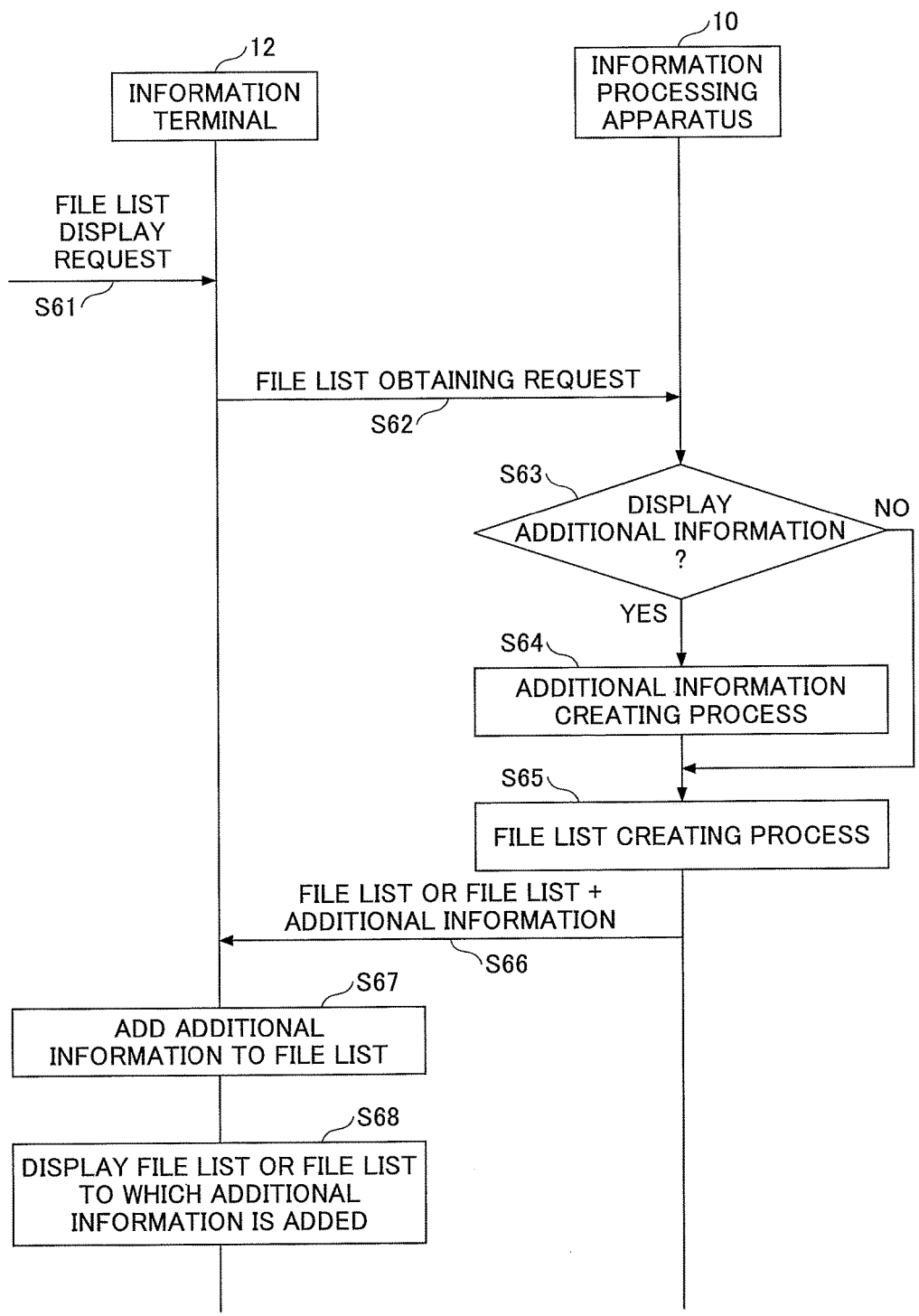
FIG. 22 is a sequence diagram depicting a file list displaying process according to the second embodiment.

FIG. 22 is a sequence diagram depicting a file list displaying process according to the second embodiment. According to this embodiment, the information processing system 1 displays a file list by the procedure depicted in FIG. 22, for example.

At step S61, the information terminal 12 receives a user's file list display request through the touchscreen 617, for example. At step S62, the request transmitting part 72 of the information terminal 12 transmits a file list obtaining request to the information processing apparatus 10.

In response to receiving the file list obtaining request, at step S63, the marker extracting part 57 of the information processing apparatus 10 refers to, for example, an additional information display necessity/non-necessity table as depicted in FIG. 23 to determine whether to display additional information in a file list screen.

FIG. 23 is a diagram depicting an additional information display necessity/non-necessity table according to this embodiment. According to the additional information display necessity/non-necessity table of FIG. 23, whether to display additional information is set in the item of "ADDITIONAL INFORMATION DISPLAY NECESSITY/NON-NECESSITY" with respect to each of the information terminals 12 of users. In the item of "ADDITIONAL INFORMATION DISPLAY NECESSITY/NON-NECESSITY", "YES" indicates that additional information is to be displayed, and "NO" indicates that additional information is not to be displayed. In response to receiving the file list obtaining request from the information terminal 12 operated by a user with respect to whom "YES" is set in the item of "ADDITIONAL INFORMATION DISPLAY NECESSITY/NON-NECESSITY" (YES at step S63), at step S64, the information processing apparatus 10 executes an additional information creating process.

The additional information creating process of step S64 corresponds to the above-described process of steps S12 through S17 of FIG. 7, and creates additional information to be added to a file list screen. At step S65, the file information managing part 55 executes a file list creating process to create a file list. In response to receiving the file list obtaining request from the information terminal 12 operated by a user with respect to whom "NO" is set in the item of "ADDITIONAL INFORMATION DISPLAY NECESSITY/NON-NECESSITY" (NO at step S63), the information processing apparatus 10 skips the additional information creating process of step S64 to execute the process of step S65. At step S66, the data transmitting part 54 of the information processing apparatus 10 transmits the created file list or the created file list and additional information to the information terminal 12 as a response to the file list obtaining request of step S62.

The data receiving part 74 of the information terminal 12 receives the file list or the file list and the additional information from the information processing apparatus 10. At step S67, the file display processing part 73 adds the additional information to the file list in the case of receiving the file list and the additional information. At step S68, the file display processing part 73 displays, for example, a file list screen 1050A including the additional information or a file list screen 1050B including no additional information, as depicted in FIG. 24, on the display 616.

Figure 24:
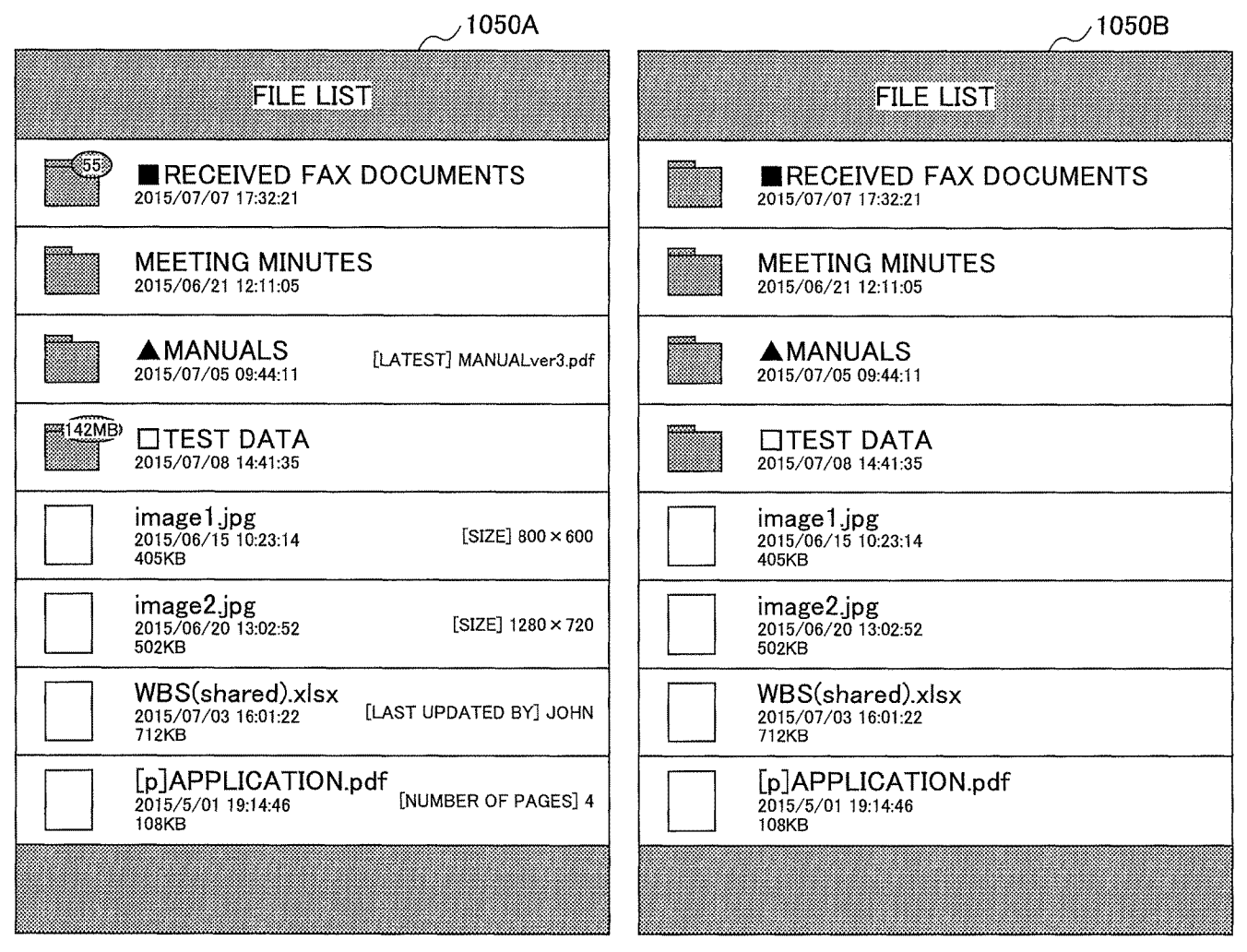

FIG. 24 is a diagram illustrating that a file list screen displayed on an information terminal differs depending on information as to whether to display additional information in an additional information display necessity/non-necessity table according to this embodiment. The file list screen 1050A is a file list screen created in response to "YES" in the item of "ADDITIONAL INFORMATION DISPLAY NECESSITY/NON-NECESSITY". The file list screen 1050A includes additional information. The file list screen 1050B is a file list screen created in response to "NO" in the item of "ADDITIONAL INFORMATION DISPLAY NECESSITY/NON-NECESSITY". The file list screen 1050B includes no additional information.

According to the file list displaying process as depicted in FIG. 22, even when the marker information retained in the setting information retaining part 58 of the information processing apparatus 10 is common to the information terminals 12, it is possible to determine whether to add additional information to a file list with respect to each information terminal 12.

Third Embodiment

According to the second embodiment, the information processing apparatus 10 uses marker information retained in the information processing apparatus 10 to execute processing related to the marker information. According to a third embodiment, the information processing apparatus 10 uses marker information retained in the information terminal 12 to execute processing related to the marker information. The third embodiment is the same as the first embodiment or the second embodiment except for some part. Accordingly, in the following description, a description of the same part as that of the first embodiment or the second embodiment may be omitted.

The information processing apparatus 10 according to the third embodiment is different from the information processing apparatus 10 according to the second embodiment in that the information processing apparatus 10 does not include the setting information retaining part 58 and that the information terminal 12 includes the marker information registering part 76 and the setting information retaining part 78.

FIG. 25 is a sequence diagram depicting a file list displaying process according to the third embodiment. According to this embodiment, the information processing system 1 displays a file list by the procedure depicted in FIG. 25, for example.

At step S71, the information terminal 12 receives a user's file list display request through the touchscreen 617, for example. At step S72, the request transmitting part 72 of the information terminal 12 obtains marker information, if any, from the setting information retaining part 78. At step S73, the request transmitting part 72 of the information terminal 12 transmits a file list obtaining request or a file list obtaining request to which the obtained marker information is added to the information processing apparatus 10.

In response to receiving the file list obtaining request, at step S74, the marker extracting part 57 of the information processing apparatus 10 determines whether marker information is added to the file list obtaining request. If marker information is added (YES at step S74), at step S75, the information processing apparatus 10 executes an additional information creating process.

The additional information creating process of step S75 corresponds to the above-described process of steps S12 through S17 of FIG. 7, and creates additional information to be added to a file list screen. At step S76, the file information managing part 55 executes a file list creating process to create a file list. If no marker information is added (NO at step S74), the information processing apparatus 10 skips the additional information creating process of step S75 to execute the process of step S76. At step S77, the data transmitting part 54 of the information processing apparatus 10 transmits the created file list or the created file list and additional information to the information terminal 12.

The data receiving part 74 of the information terminal 12 receives the file list or the file list and the additional information from the information processing apparatus 10. At step S78, the file display processing part 73 adds the additional information to the file list in the case of receiving the file list and the additional information. At step S79, the file display processing part 73 displays, for example, the file list screen 1050A including the additional information or the file list screen 1050B including no additional information, as depicted in FIG. 24, on the display 616.

According to the file list displaying process as depicted in FIG. 25, the information processing apparatus 10 may use marker information retained in the setting information retaining part 78 of the information terminal 12 to execute processing related to the marker information.

Fourth Embodiment

According to the second embodiment and the third embodiment, the information processing apparatus 10 transmits a file list and additional information to the information terminal 12. According to a fourth embodiment, the information processing apparatus 10 creates screen data and transmits the created screen data to the information terminal 12.

FIG. 26 is a sequence diagram depicting a file list displaying process according to the fourth embodiment. According to this embodiment, the information processing system 1 displays a file list by the procedure depicted in FIG. 26, for example. The process of steps S81 through S85 is the same as the process of steps S61 through S65 of FIG. 22.

At step S86, the request processing part 52 of the information processing apparatus 10 creates the screen data of a file list or a file list to which additional information is added. At step S87, the data transmitting part 54 of the information processing apparatus 10 transmits the created screen data to the information terminal 12 as a response to the file list obtaining request of step S82.

The data receiving part 74 of the information terminal 12 obtains the screen data from the information processing apparatus 10. At step S88, the file display processing part 73 displays, for example, the file list screen 1050A including the additional information or the file list screen 1050B including no additional information, as depicted in FIG. 24, on the display 616.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
an information processing apparatus including a first hardware processor configured to execute a first program to implement a first part of an information processing process; and
one or more information terminals each including a second hardware processor configured to execute a second program to implement a second part of the information processing process, the information processing process including:
obtaining a list of a plurality of files stored in a storage, the list further including a storage area of at least one file;
obtaining marker information correlating each of a plurality of markers with a corresponding operation;
determining whether a marker among the plurality of markers is included in a name of a file included in the obtained list by comparing the obtained list to the plurality of markers in the obtained marker information;
obtaining additional information by executing the corresponding operation correlated with the marker, and adding the obtained additional information to the obtained list, in response to determining that the marker is included in the name of the file included in the obtained list; and
displaying the obtained list with the added additional information on an information terminal among the one or more information terminals,
wherein information that is related to the file included in the obtained list and is obtained by executing the corresponding operation correlated with the marker is added to the obtained list as the additional information, in response to determining that the marker is included in the name of the file included in the obtained list,
wherein information on a user who has last updated the file, a number of pages of the file, or a number of pixels of the file is added as the information related to the file included in the obtained list, and
wherein when names of the plurality of files of the obtained list include respective markers among the plurality of markers with the respective markers being of types different from each other, the names of the plurality of files of the obtained list are displayed with respective items of the additional information added to the obtained list, the names and the respective items being displayed separately from each other, the respective items corresponding to the types of the respective markers of the names of the plurality of files and being different from each other.

2. The information processing system as claimed in claim 1, wherein information that is related to the at least one file stored in the storage area and is obtained by the executing the corresponding operation correlated with the marker is added to the obtained list as the additional information, in response to determining that the marker is included in the name of the storage area.

3. The information processing system as claimed in claim 2, wherein a number of the at least one file, a size of the at least one file, or a name of a latest one of the at least one file is added as the information related to the at least one file.

4. The information processing system as claimed in claim 1, wherein the obtained marker information further correlates each of the plurality of markers with a corresponding display form, and the information processing operation further includes changing a display form of the additional information in the list in accordance with the display form of the obtained marker information.

5. The information processing system as claimed in claim 1, wherein the information processing operation further includes deleting the marker from the name of the file included in the obtained list after adding the additional information, in response to the determining that the marker is included in the name of the file included in the obtained list.

6. The information processing system as claimed in claim 1, wherein the information processing operation further includes registering the obtained marker information with respect to each of the one or more information terminals or each of one or more users operating the one or more information terminals.

7. The information processing system as claimed in claim 1, wherein the marker is specified by one or more symbols, one or more characters, one or more numbers, or any combination of the one or more symbols, the one or more characters, and the one or more numbers, and the obtained marker information further correlates the marker with a corresponding position of the marker in the name of the file in which the marker is included.

8. An information processing method executed by a computer executing a program, the information processing method comprising:
receiving a list of a plurality of files from an information processing apparatus, the list further including a storage area of at least one file;
obtaining marker information correlating each of a plurality of markers with a corresponding operation;
determining whether a marker among the plurality of markers is included in a name of a file included in the received list by comparing the received list and the plurality of markers in the obtained marker information;
adding additional information obtained by execution of the corresponding operation correlated with the marker to the received list in response to determining that the marker is included in the name of the file included in the received list; and
displaying the received list with the added additional information,
wherein information that is related to the file included in the list and is obtained by the execution of the corresponding operation correlated with the marker is added to the received list as the additional information, in response to determining that the marker is included in the name of the file included in the received list,
wherein information on a user who has last updated the file, a number of pages of the file, or a number of pixels of the file is added as the information related to the file included in the received list, and
wherein when names of the plurality of files of the received list include respective markers among the plurality of markers with the respective markers being of types different from each other, the names of the plurality of files of the received list are displayed with respective items of the additional information added to the received list, the names and the respective items being displayed separately from each other, the respective items corresponding to the types of the respective markers of the names of the plurality of files and being different from each other.

9. An information processing method executed by a computer executing a program, the information processing method comprising:

receiving a request to obtain a list of a plurality of files from an information terminal;

obtaining the list of the plurality of files stored in a storage, the obtained list further including a storage area of at least one file;

obtaining marker information correlating each of a plurality of markers with a corresponding operation;

determining whether a marker among the plurality of markers is included in a name of a file included in the obtained list by comparing the obtained list and the plurality of markers in the obtained marker information;

obtaining additional information by executing the corresponding operation correlated with the marker in response to determining that the marker is included in the name of the file included in the obtained list; and transmitting the obtained list and the additional information to the information terminal to cause the obtained list with the added additional information to be displayed on the information terminal, wherein information that is related to the file included in the obtained list and is obtained by executing the corresponding operation correlated with the marker is added to the obtained list as the additional information, in response to determining that the marker is included in the name of the file included in the obtained list, wherein information on a user who has last updated the file, a number of pages of the file, or a number of pixels of the file is added as the information related to the file included in the obtained list, and wherein when names of the plurality of files of the obtained list include respective markers among the plurality of markers with the respective markers being of types different from each other, the names of the plurality of files of the obtained list are displayed with respective items of the additional information added to the obtained list, the names and the respective items being displayed separately from each other, the respective items corresponding to the types of the respective markers of the names of the plurality of files and being different from each other.

10. The information processing system as claimed in claim 1, wherein the additional information is a result of the executing the corresponding process correlated with the marker.

11. The information processing system as claimed in claim 1, wherein the marker and the additional information are individually displayed with respect to the file in the obtained list displayed on the information terminal.

12. The information processing system as claimed in claim 7, wherein the corresponding position of the marker in the name of the file in which the marker is included is a beginning of the name, an end of the name, or an extension following the name.

13. The information processing system as claimed in claim 1, wherein the additional information obtained by the executing the corresponding process correlated with the marker differs between users of the information processing system.

* * * * *